United States Patent
Shen et al.

(10) Patent No.: US 8,396,153 B1
(45) Date of Patent: Mar. 12, 2013

(54) COOPERATIVE MIMO IN MULTICELL WIRELESS NETWORKS

(75) Inventors: Manyuan Shen, Bellevue, WA (US); Guanbin Xing, Issaquah, WA (US); Hui Liu, Clyde Hill, WA (US)

(73) Assignee: Adaptix, Inc., Carrollton, TX (US)

( * ) Notice: Subject to any disclaimer, the term of this patent is extended or adjusted under 35 U.S.C. 154(b) by 985 days.

(21) Appl. No.: 12/130,277

(22) Filed: May 30, 2008

Related U.S. Application Data

(63) Continuation-in-part of application No. 11/007,570, filed on Dec. 7, 2004, now Pat. No. 7,428,268.

(51) Int. Cl.
*H04B 7/02* (2006.01)
(52) U.S. Cl. .......................... 375/267; 370/464
(58) Field of Classification Search .............. 375/259, 375/260, 267, 299, 347; 370/464
See application file for complete search history.

(56) References Cited

U.S. PATENT DOCUMENTS

| | | | |
|---|---|---|---|
| 6,662,024 B2 | 12/2003 | Walton et al. | |
| 6,985,434 B2 | 1/2006 | Wu et al. | |
| 6,996,056 B2 | 2/2006 | Chheda et al. | |
| 7,058,367 B1 | 6/2006 | Luo et al. | |
| 7,126,996 B2 | 10/2006 | Classon et al. | |
| 7,224,977 B2 | 5/2007 | Cavalli et al. | |
| 7,352,718 B1 | 4/2008 | Perahia et al. | |
| 7,428,268 B2 | 9/2008 | Shen et al. | |
| 7,460,466 B2 | 12/2008 | Lee et al. | |
| 7,529,311 B2 | 5/2009 | Shen et al. | |
| 7,974,571 B2 * | 7/2011 | Dankberg et al. | 455/3.02 |
| 8,228,809 B1 | 7/2012 | Xing et al. | |
| 2002/0102950 A1 | 8/2002 | Gore et al. | |
| 2002/0181390 A1 | 12/2002 | Mody et al. | |
| 2002/0181509 A1 | 12/2002 | Mody et al. | |
| 2003/0104808 A1 | 6/2003 | Foschini et al. | |
| 2003/0125040 A1 | 7/2003 | Walton et al. | |
| 2003/0190897 A1 | 10/2003 | Lei et al. | |
| 2004/0001429 A1 | 1/2004 | Ma et al. | |
| 2004/0082311 A1 | 4/2004 | Shiu et al. | |
| 2004/0120274 A1 | 6/2004 | Petre et al. | |
| 2004/0127223 A1 | 7/2004 | Li et al. | |
| 2004/0162080 A1 | 8/2004 | Kostic et al. | |
| 2004/0192204 A1 | 9/2004 | Periyalwar et al. | |
| 2005/0047517 A1 | 3/2005 | Georgios et al. | |
| 2005/0070287 A1 | 3/2005 | Cave et al. | |
| 2005/0141644 A1 | 6/2005 | Sadowsky | |

(Continued)

FOREIGN PATENT DOCUMENTS

EP 1 648 097 4/2006
JP 7-245776 A 9/1995
(Continued)

OTHER PUBLICATIONS

Inoue, Manabu, et al., "Space Time Transmit Diversity for OFDM Multi Base Station System", Mobile and Telecommunications Network, 2002; 4th International Workshop, Sep. 9-11, 2002; pp. 30-34.

(Continued)

*Primary Examiner* — David B. Lugo
(74) *Attorney, Agent, or Firm* — Martin & Ferraro, LLP

(57) ABSTRACT

A method and system for cooperative multiple-input multiple output (MIMO) transmission and reception operations in a multicell wireless network. Under the method, antenna elements from multiple base stations and/or multiple antennas are utilized to from an augmented MIMO antenna array that is used to transmit and receive MIMO transmissions at base stations and/or terminals. The cooperative MIMO transmission scheme supports higher dimension space-time-frequency processing for increased capacity and system performance.

18 Claims, 20 Drawing Sheets

U.S. PATENT DOCUMENTS

| | | | |
|---|---|---|---|
| 2006/0056530 A1* | 3/2006 | Nakao | 375/260 |
| 2006/0083195 A1 | 4/2006 | Forenza et al. | |
| 2006/0120477 A1 | 6/2006 | Shen et al. | |
| 2007/0010196 A1* | 1/2007 | Periyalwar et al. | 455/7 |
| 2007/0049218 A1 | 3/2007 | Gorokhov et al. | |
| 2008/0046949 A1 | 2/2008 | Liu | |
| 2008/0075033 A1* | 3/2008 | Shattil | 370/328 |
| 2008/0159203 A1 | 7/2008 | Choi et al. | |
| 2008/0175189 A1 | 7/2008 | Furrer et al. | |
| 2009/0016290 A1* | 1/2009 | Chion et al. | 370/329 |
| 2009/0161605 A1 | 6/2009 | Shen et al. | |
| 2010/0119004 A1 | 5/2010 | Hadad | |
| 2012/0275387 A1 | 11/2012 | Xing et al. | |

FOREIGN PATENT DOCUMENTS

| | | |
|---|---|---|
| JP | 9-037337 A | 2/1997 |
| JP | 10-308972 A | 11/1998 |
| JP | 2001-036463 A | 2/2001 |
| JP | 2001-339342 A | 12/2001 |
| JP | 2004-040232 | 2/2004 |
| JP | 2004-064108 | 2/2004 |
| JP | 2004-072566 | 3/2004 |
| JP | 2004-523934 | 8/2004 |
| WO | WO 02/31766 A2 | 4/2002 |
| WO | WO 02/31991 A2 | 5/2002 |
| WO | WO-03/081938 | 10/2003 |
| WO | WO-2006/016485 | 2/2006 |

OTHER PUBLICATIONS

Tang, Yipeng, et al., "Coded Transmit Macrodiversity: Block Space-Time Codes over Distributed Antennas", Connecting the Mobile World: Proceedings/IEEE VTS 53rd Vehicular Technology Conference, IEEE Service Center, May 6, 2001, pp. 1435-1438.

Dohler, Mischa, et al., "Performance of Distributed Space-Time Block Codes", Vehicular Technology Conference, May 17, 2004, USA; 746. pp. 742.

Extended European Search Report issued for EP05853371.2-2415, issued on Aug. 5, 2010, 14 pages.

International Search Report and Written Opinion issued for PCT Application PCT/US2007/073322; Dated: Feb. 25, 2008; 9 Pages.

Naguib, Ayman et al., "Space-Time Coding and Signal Processing for High Data Rate Wireless Communications", ATT&T Labs-Research, Dated Jan. 18, 2001, pp. 53 (with internet abstract attached).

Love, David et al., "Grassmannian Beamforming for Multiple-Input Multiple-Output Wireless Systems", IEEE Transactions of Information Theory, vol. 49, No. 10, Oct. 2003, pp. 2735-2747.

Poo, Lei, "Space-Time Coding for Wireless Communication: A Survey", Stanford University, dated Fall 2002, pp. 1-17.

Naguib, Ayman et al., "A Space-Time Coding Modem for High-Data-Rate Wireless Communications", IEEE Journal on Selected areas in Communications, vol. 16, No. 8, Oct. 1998, pp. 1459-1478.

V. Tarokh et al., "Space-Time Codes for High Data Rate Wireless Communication: Performance Criterion and Code Construction", IEEE Trans. Inform Theory, vol. 44, No. 2, Mar. 1998, pp. 744-765.

V. Tarokh et al., "Space-Time Block Codes from Orthogonal Designs", IEEE Trans. Inform. Theory, vol. 45, No. 5, Jul. 1999, pp. 1456-1467.

Miyano, T., et al., "Space time coded cooperative relaying technique for multihop communications", IEEE 60th Vehicular Technology Conference, VTC2004-Fall, 2004, IEE Piscataway, New Jersey, pp. 5140-5144.

European Office Action issued for European Patent Application No. 05853371.2, dated Mar. 23, 2011, 8 pages.

Umehira, M., et al., "100Mbit/s SDM-COFDM over MIMO Channel for Broadband Mobile Communications", Technical Report of the Institute of Electronics, Information and Communication Engineers, Japan, Oct. 12, 2001. vol. 101, No. 370, pp. 37-42.

Agustin, A., et al., "Hybrid turbo FEC/ARQ system and distributed space-time cooperative transmission in the downlink," Personal, Indoor, and Mobile Radio Communications, 2004, PIMRC International Symposium, Sep. 8, 2004, vol. 1, pp. 380-384.

Oechtering, Tobia J., On the Capacity of a Distributed Multiantenna System using Cooperative Transmitters, Vehicular Technology Conference, 2003, VTC 2003-Spring, Apr. 25, 2003, vol. 1, pp. 75-79.

Office Action issued for Japanese Patent Application No. 2007-544635, dated Aug. 18, 2011, 8 pages. (with English translation).

Office Action issued for Taiwan Patent Application No. 094143280, dated Nov. 16, 2011, 17 pages, with English language translation.

International Search Report and Written Opinion issued for PCT/US05/44429 dated Oct. 20, 2006.

Max Costa, "Writing on Dirty Paper," IEEE Transaction on Information Theory, vol. IT-29, No. 3, May 1983.

W Yu, D.P. Varodayan and J.M. Cioffi, "Trellis and convolutional precoding for transmitter-based interference presubstraction," IEEE Trans. on Communications, vol. 53, No. 7, pp. 1220-1230, Jul. 2005.

Zehavi, Ephraim, "8-PSK Trellis Codes for a Rayleigh Channel," May 1992, IEEE Transactions on Communications, vol. 40, Issue 5, pp. 873-874.

Samsung and Snu; Text proposal for MIMO TR25.876 V1.2.1 [online], 3GPP TSG-RAN WG1#36 R1-040256; Website: URL:http://www.3gpp.org/ftp/tsg_ran/WG1_RL1/TSGR1_36/Docs/Zips/R1-040256.zip; Feb. 20, 2004.

Toda, Ken et al "Field Experiment of a Space-Time Equalizer Using Delay Diversity Transmission;" Technical Report of the Institute of Electronics, Information, and Communication Engineering; Mar. 18, 2001; vol. 100, No. 91; pp. 17-23; RCS2001-34.

Zhang, Hongyuan et al.; "On the Capacity of Distributed MIMO Systems;" 2004 Conference on Information Sciences and Systems; Mar. 19, 2004; pp. 1-5.

Zhou, Quan et al.; "Adaptive Spatial Multiplexing Techniques for Distributed MIMO Systems," 2004 Conference on Information Sciences and Systems; Mar. 19, 2004.

* cited by examiner

Input: 0 1 5 7 6 4
Tx 1: 0 0 5 1 3 6
Tx 2: 0 1 5 7 6 4
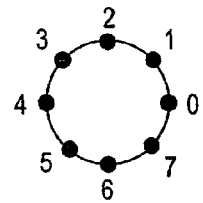
*Fig. 10*
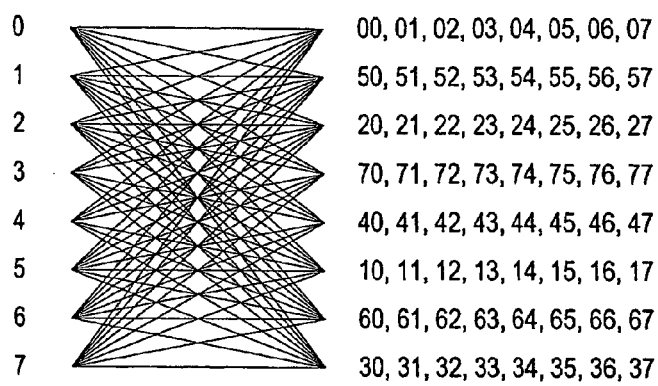
| | |
|---|---|
| 0 | 00, 01, 02, 03, 04, 05, 06, 07 |
| 1 | 50, 51, 52, 53, 54, 55, 56, 57 |
| 2 | 20, 21, 22, 23, 24, 25, 26, 27 |
| 3 | 70, 71, 72, 73, 74, 75, 76, 77 |
| 4 | 40, 41, 42, 43, 44, 45, 46, 47 |
| 5 | 10, 11, 12, 13, 14, 15, 16, 17 |
| 6 | 60, 61, 62, 63, 64, 65, 66, 67 |
| 7 | 30, 31, 32, 33, 34, 35, 36, 37 |
8-PSK 8-State Space-Time Code with 2 Tx Antennas
Input: 0 1 5 7 6 4
Tx 1: 0 0 1 5 7 6
Tx 2: 0 1 5 7 6 4
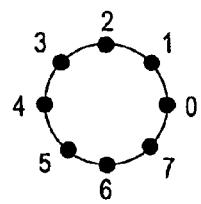
*Fig. 14*
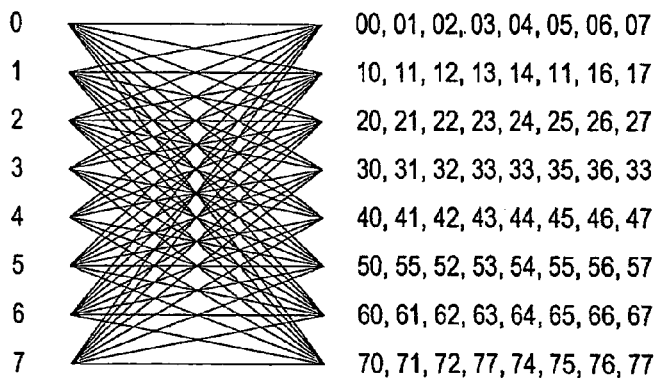
| | |
|---|---|
| 0 | 00, 01, 02, 03, 04, 05, 06, 07 |
| 1 | 10, 11, 12, 13, 14, 11, 16, 17 |
| 2 | 20, 21, 22, 23, 24, 25, 26, 27 |
| 3 | 30, 31, 32, 33, 33, 35, 36, 33 |
| 4 | 40, 41, 42, 43, 44, 45, 46, 47 |
| 5 | 50, 55, 52, 53, 54, 55, 56, 57 |
| 6 | 60, 61, 62, 63, 64, 65, 66, 67 |
| 7 | 70, 71, 72, 77, 74, 75, 76, 77 |
8-PSK 8-State Delay Diversity Code with 2 Tx Antennas 16-QAM 16-State Space-Time Code with 2 Tx Antennas

COOPERATIVE MIMO IN MULTICELL WIRELESS NETWORKS

CROSS-REFERENCE TO RELATED APPLICATIONS

This application is a continuation-in-part of and claims priority to U.S. patent application Ser. No. 11/007,570 entitled COOPERATIVE MIMO IN MULTICELL WIRELESS NETWORKS, filed on Dec. 7, 2004, the disclosure of which is expressly incorporated by reference herein.

TECHNICAL FIELD

The present invention relates to the field of communications systems; more particularly, the present invention relates to techniques for performing MIMO operations in a multicell wireless network.

BACKGROUND OF THE INVENTION

With high-speed wireless services increasingly in demand, there is a need for more throughput per bandwidth to accommodate more subscribers with higher data rates while retaining a guaranteed quality of service (QoS). In point-to-point communications, the achievable data rate between a transmitter and a receiver is constrained by the available bandwidth, propagation channel conditions, as well as the noise-plus-interference levels at the receiver. For wireless networks where a base-station communicates with multiple subscribers, the network capacity also depends on the way the spectral resource is partitioned and the channel conditions and noise-plus-interference levels of all subscribers. In current state-of-the-art, multiple-access protocols, e.g., time-division multiple access (TDMA), frequency-division multiple-access (FDMA), code-division multiple-access (CDMA), are used to distribute the available spectrum among subscribers according to subscribers' data rate requirements. Other critical limiting factors, such as the channel fading conditions, interference levels, and QoS requirements, are ignored in general.

The fundamental phenomenon that makes reliable wireless transmission difficult to achieve is time-varying multipath fading. Increasing the quality or reducing the effective error rate in a multipath fading channel may be extremely difficult. For instance, consider the following comparison between a typical noise source in a non-multipath environment and multipath fading. In environments having additive white Gaussian noise (AWGN), it may require only 1- or 2-db higher signal-to-noise ratio (SNR) using typical modulation and coding schemes to reduce the effective bit error rate (BER) $10^{-2}$ from $10^{-3}$. Achieving the same reduction in a multipath fading environment, however, may require up to 10 db improvement in SNR. The necessary improvement in SRN may not be achieved by simply providing higher transmit power or additional bandwidth, as this is contrary to the requirements of next generation broadband wireless systems.

One set of techniques for reducing the effect of multipath fading is to employ a signal diversity scheme, wherein a combined signal is received via independently fading channels. Under a space diversity scheme, multiple antennas are used to receive and/or send the signal. The antenna spacing must be such that the fading at each antenna is independent (coherence distance). Under a frequency diversity scheme, the signal is transmitted in several frequency bands (coherence BW). Under a time diversity scheme, the signal is transmitted in different time slots (coherence time). Channel coding plus interleaving is used to provide time diversity. Under a polarization diversity scheme, two antennas with different polarization are employed for reception and/or division.

Spatial diversity is commonly employed in modern wireless communications systems. To achieve spatial diversity, spatial processing with antenna arrays at the receiver and/or transmitter is performed. Among many schemes developed to date, multiple-input multiple-output (MIMO) and beamforming are the two most studied and have been proved to be effective in increase the capacity and performance of a wireless network, (see, e.g., Ayman F. Naguib, Vahid Tarokh, Nambirajan Seshadri, A. Robert Calderbank, "A Space-Time Coding Modem for High-Data-Rate Wireless Communications", IEEE Journal on Selected Areas in Communications, vol. 16, no. 8, October 1998 pp. 1459-1478). In a block time-invariant environment, it can be shown that in a system equipped with Nt transmit antennas and Nr receive antennas, a well designed space-time coded (STC) systems can achieve a maximum diversity of Nr*Nt. Typical examples of STC include space-time trellis codes (STTC) (see, e.g., V. Tarokh, N. Seshadri, and A. R. Calderbank, "Space-time codes for high data rate wireless communication: performance criterion and code construction", IEEE Trans. Inform. Theory, 44:744-765, March 1998) and space-time block codes from orthogonal design (STBC-OD) (see, e.g., V. Tarokh, H. Jafarkhani, and A. R. Calderbank, "Space-time block codes from orthogonal designs", IEEE Trans. Inform. Theory, 45:1456-1467, July 1999.)

Since the capacity and performance of an MIMO system depends critically on its dimension (i.e., Nt and Nr) and the correlation between antenna elements, larger size and more scattered antenna arrays are desirable. On the other hand, costs and physical constraints prohibit the use of excessive antenna arrays in practice.

BRIEF SUMMARY OF THE INVENTION

A method and system is disclosed herein for cooperative multiple-input multiple output (MIMO) transmission operations in a multicell wireless network. Under one embodiment, antenna elements from two or more base stations are used to from an augmented MIMO antenna array that is used to transmit and receive MIMO transmissions to and from one or more terminals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 10 shows an exemplary PSK-based space-time trellis code (STTC) encoder;

FIG. 14 is a block diagram of an exemplary PSK-based STTC delay diversity encoder;

DETAILED DESCRIPTION OF THE INVENTION

Figure 1:
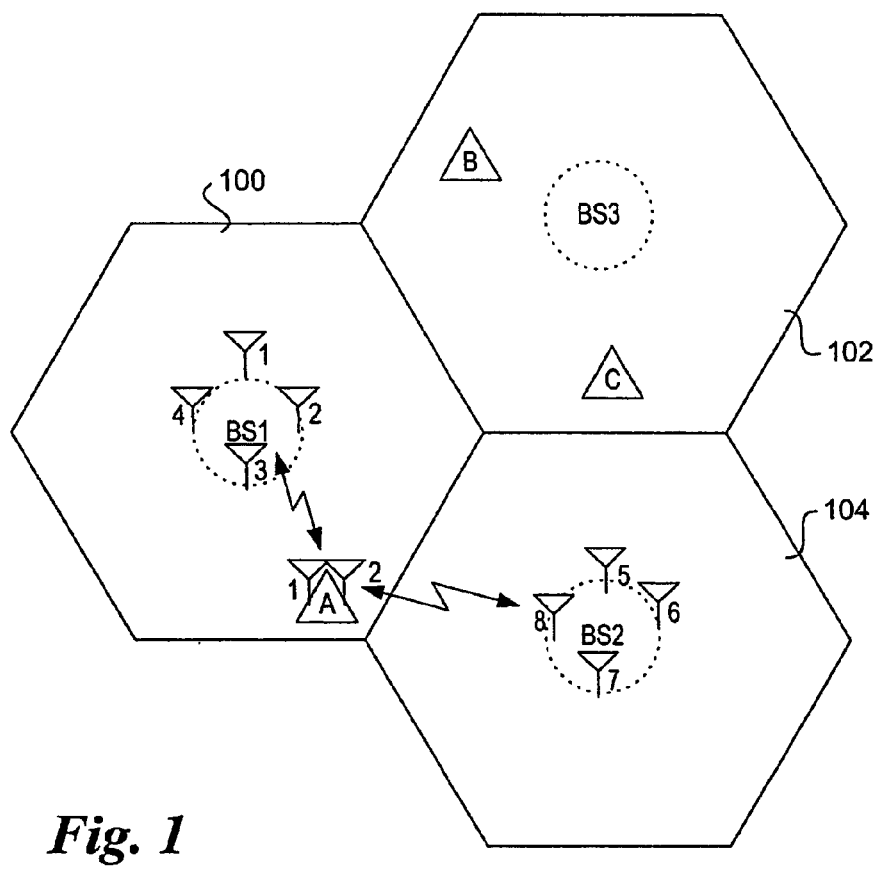
FIG. 1 depicts a multicell scenario where antenna elements from multiple base-stations are augmented to form a higher dimension MIMO transceiver array.

In accordance with aspects of the present invention, a method and apparatus to augment antenna elements from two or more base-stations and/or terminals to perform higher dimensional MIMO operations is disclosed. In one implementation, MIMO/joint space-time coding is employed across multiple base stations in a cellular environment, wherein the cooperative transmission of signals is performed at the modulation and coding level. According to another embodiment, MIMO/joint space-time coding is employed across multiple terminals in a similar fashion. This novel approach introduces additional diversities and capacities to existing network components with minimal additional costs. Because of the increase in the number of transmit antennas, the number of simultaneous users increases, leading to better spectrum efficiency.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 depicts three cells 100, 102, and 104 for a typical wireless network with multiple base stations BS1, BS2 and BS3 and terminals A, B, and C. Each of base stations BS1 and BS2 includes a 4-element circular antenna array, while terminal A has two antennas 1 and 2.

Figure 2:
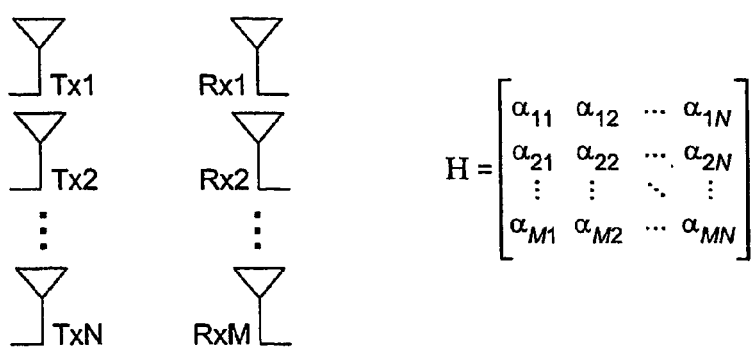
FIG. 2 shows a generic channel matrix H used for modeling the capacity of MIMO systems.

From a theoretical viewpoint, the capacity between a transmitter and a receiver for a MIMO transmission scheme is determined by the vector channel H, which is also referred to as the channel matrix. As illustrated in FIG. 2, the channel matrix H includes M rows and N columns, wherein M is the number of receiver antennas (Rx) and N is the number of transmitter antennas (Tx). In the illustrated channel matrix H, each entry $\alpha_{ij}$ is the complex channel gain from the i-th transmit antenna to the j-th receive antenna.

The channel capacity for a Single-Input Single-Output (SISO) channel is, $$C = \log_2(1+p) \text{ bits/sec/use} \quad (1),$$

where p is the signal to noise ratio. The channel capacity for a MIMO channel is, $$C = \log_2 \det\left[I + \frac{P}{N}HH^*\right]. \quad (2)$$

From the above, the outage capacity can be shown to be, $$C = \frac{1}{2}M \log_2(1 + \sigma\{h\}^2 p). \quad (3)$$

Figure 3:
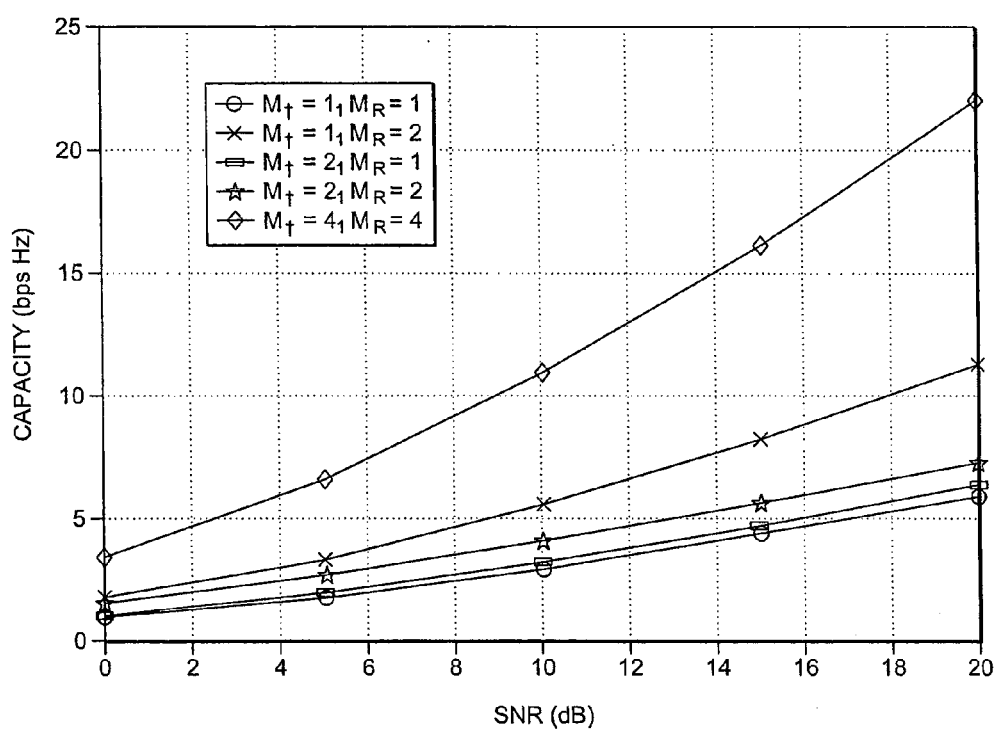
FIG. 3 shows the capacity increase of an MIMO system with respect to the number of transmitting antennas.

It is observed that under equation (3), the capacity increases linearly with the number of receive antennas when M is large. The channel capacity limit grows logarithmically when adding an antenna array at the receiver side (Single-Input Multiple-Output—SIMO). Meanwhile, the channel capacity limit grows as much as linearly with min(M,N), which is the maximum number of spatial eigenmodes, in the case of a MIMO system. An illustration of a MIMO system capacity as a function of channel matrix dimension is shown in FIG. 3.

Since the system capacity is dictated by the dimension (number of antennas) and the condition (correlation between antenna elements) of the channel, it is desirable to have large size antenna array with more scattered elements. However, there is a point of diminishing return, wherein the costs of adding antenna elements and corresponding processing complexity for a given base station or terminal exceeds the benefit of the incremental increase in system capacity. Furthermore, to obtain the added benefit of extra capacity, it may be necessary to add additional antenna elements to many or all base stations or terminals within a given wireless network.

Embodiments of the present invention take advantage of the benefit of having large size antenna arrays with more scattered elements without requiring additional antenna elements. This is accomplished by augmenting the operations of antenna elements from two or more transmitters to form a larger size antenna array. The augmented array performs "cooperative MIMO" transmission operations for one or more receivers. For example, FIG. 1 shows an exemplary use of a cooperative MIMO transmission scheme, wherein the antenna elements for base stations BS1 and BS2 are augmented to cooperatively communicate via receive antennas 1 and 2 for terminal A.

Figure 4A:
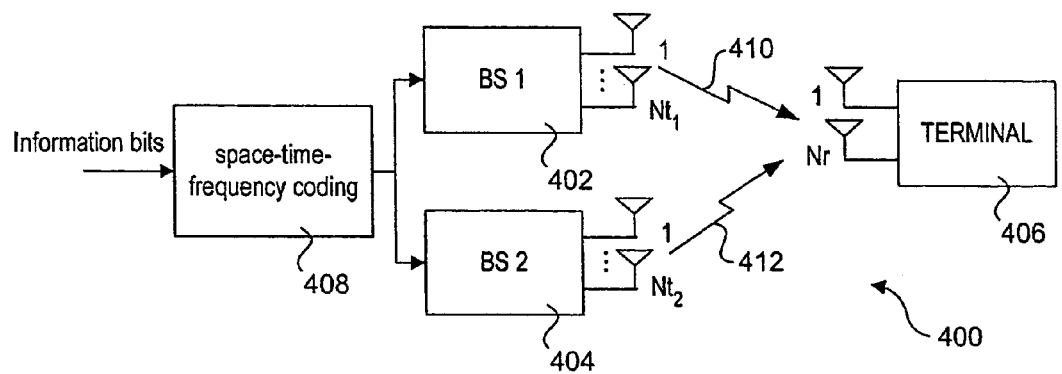
FIG. 4a shows a cooperative MIMO architecture under which antenna arrays from two base stations are employed in a cooperative MIMO transmission scheme to transmit downlink signals to one terminal.

FIG. 4a depicts a block diagram of one embodiment of a downlink (from base stations to terminals) cooperative MIMO architecture 400. For illustrative purposes, the architecture shown in FIG. 4a include two base stations 402 and 404 and a single terminal 406. It will be understood that an actual implementation of MIMO architecture 400 may include two or more base stations that transmit signals that are received by one or more terminals.

In the illustrated embodiment of FIG. 4a, base station 402 has an antenna array including $Nt_1$ transmit antennas, while base station 404 has an antenna array including $Nt_2$ antennas and terminal 406 includes Nr antennas. In view of the foregoing MIMO definitions, the cooperative use of the base station antennas increases the MIMO dimension to $(Nt_1+Nt_2)$*Nr. This increase in dimension is accomplished without requiring any additional antenna elements at the base stations, as well as the components use to drive the antennas.

According to aspects of various embodiments of the invention described herein, an information bit sequence corresponding to data to be transmitted to a subscriber (e.g., terminal 406) may be space-time, space-frequency, or space-time-frequency coded, as depicted by a block 408 in FIG. 4a. In some embodiments, space-time, space-frequency, or space-time-frequency codes may be augmented to support delay diversity, as described below. After appropriate encoding is performed in block 408, the coded data is then passed to the base stations, whereupon it is transmitted via applicable antenna elements at those base stations. The two or more base stations then perform joint MIMO transmissions (depicted as signals 410 and 412) towards the subscriber (e.g., a user operating terminal 406) in view of applicable MIMO channel configuration parameters. For example, signals 410 and 412 transmitted from base stations 402 and 404 may employ selected antenna elements for each of the base stations based on the coding scheme and/or MIMO scheme that is currently employed for a particular subscriber. In general, cooperative MIMO transmissions can be performed during regular communication, or during handoff, where a subscriber moves across the boundary between cells.

In one embodiment, space-time coding is employed. For example, incoming information bits are space-time coded (using e.g., space-time block or trellis codes) at block 408, and the encoded data are forwarded to each of base stations 402 and 404. Further details of space-time block encoding and the use of space-time trellis codes are discussed below.

In one embodiment, the space-time (or space-frequency, or space-time-frequency) coding is performed at a master encoder. In another embodiment, the space-time (or space-frequency, or space-time-frequency) is performed at separate locations (e.g., within the base stations) based on a common (replicated) information bit sequence received at each of the separate locations.

Figure 4B:
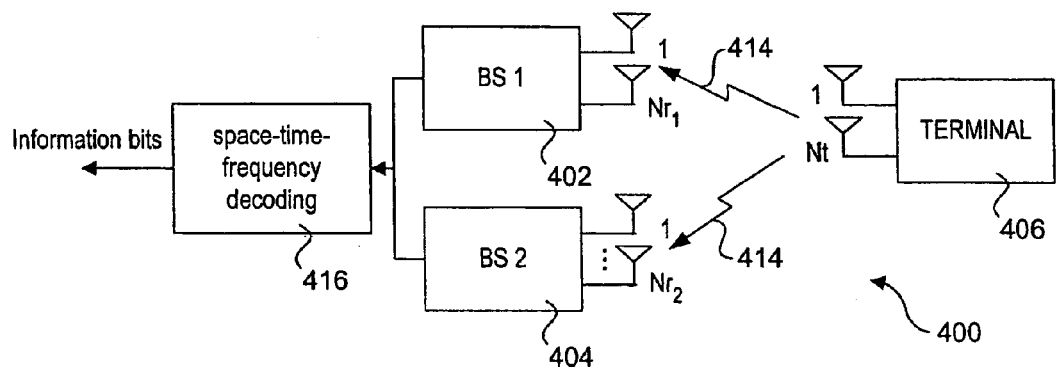
FIG. 4b shows aspects of the cooperative MIMO architecture of FIG. 4a employed for transmitting and processing uplink signals received by the augmented antenna array.

FIG. 4b shows uplink signal processing aspects of cooperative MIMO architecture 400. In this instance, an uplink signal 414 is transmitted from terminal 406 via selected antennas from among transmit antennas 1-Nt. The uplink signal 414 is received by the respective receive antenna arrays (1-$Nr_1$, 1-$Nr_2$) for base stations 402 and 404. (It is noted that the same antennas may be used for both transmit and receive operations for some embodiments, while separate sets of transmit and receive antennas may be employed for other embodiments.) Upon being received at the base stations, initial signal processing is performed on the uplink signals, and the processed signals are forwarded to a block 416 to perform joint MIMO decoding and demodulation, thus extracting the information bits corresponding to the data transmitted by terminal 406. In general, the components for performing the operations of block 416 may be implemented in a master decoder that is centrally located with respect to multiple base stations (e.g., base stations 402 and 404), or may be located at one of the multiple base stations.

Figure 5:
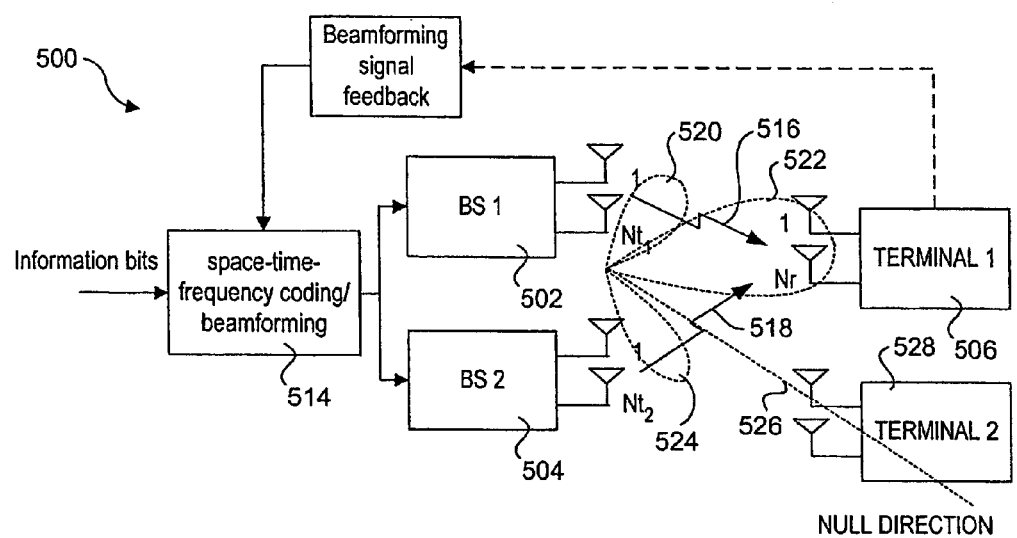
FIG. 5 shows an extension to the cooperative MIMO architecture of FIG. 4a, wherein beamforming is used to direct a MIMO transmission toward one terminal while performing spatial nulling towards another terminal.

FIG. 5 depicts a multi-user cooperative MIMO architecture 500. Under this embodiment, the augmented antenna array (comprising selected transmit antenna elements for base stations 502 and 504) is used to perform MIMO operation towards one or more intended subscribers while limiting the radio signal at the location/direction of un-intended subscribers using a beamforming and nulling scheme. For example, techniques are known for steering transmitted signals toward selected locations, while transmitted signals sent toward other directions are nullified due to signal canceling effects and/or fading effects. Collectively, these selective transmission techniques are referred to as beamforming, and are accomplished by using appropriate antenna elements (an augmented array of antennas hosted by two or more base stations under the embodiments herein) and applicable control of the signals transmitted from those antenna elements (e.g., via weighted inputs derived from feedback returned from a targeted terminal). Under beamforming embodiments of the invention, current techniques employed for antenna arrays located at a single base stations (see, e.g., D. J. Love, R. W. Heath Jr., and T. Strohmer, "Grassmannian Beamforming for Multiple-Input Multiple-Output Wireless Systems," IEEE Transactions on Information Theory, vol. 49, pp. 2735-2747, October 2003) are extended to support beamforming operations via selected antenna elements hosted by multiple base stations. As described below, it may be necessary to employ signal synchronization between multiple base stations to obtain the desired beamforming results.

In the embodiment of FIG. 5, information bits are encoded using one of space-time, space-frequency, or space-time-frequency coding schemes in a block 514. Block 514 is also employed to perform beamforming operations, as describe below in further detail with reference to FIG. 7b. The encoded output of block 514 is then provided to each of base stations 502 and 504, which in turn transmit respective signals 516 and 518. As depicted by lobes 520, 522, and 524, the channel characteristics of the combined signals 516 and 518 produce areas of higher gain in certain directions. At the same time, the gain of the combined signals 516 and 518 in other directions, such as depicted by a null direction 526, may be greatly reduced (e.g., to the point at which the signal cannot be decoded) due to spatial nulling. In one embodiment, spatial nulling is performed at the direction of un-intended subscribers.

For example, under the scenario illustrated in FIG. 5, the combined signals 516 and 518 are controlled so as to produce a high gain within lobe 522. As such, terminal 506 receives a good signal at its antenna array, and can decode the combined MIMO signal using appropriate MIMO decoding techniques that are well-known in the wireless communication system arts. Meanwhile, the strength of the combined signal received at a terminal 528 is nulled using spatial nulling. Accordingly, data corresponding to the information bits received at block 514 is transmitted to only terminal 506, and is not received by terminal 528.

Figure 6:
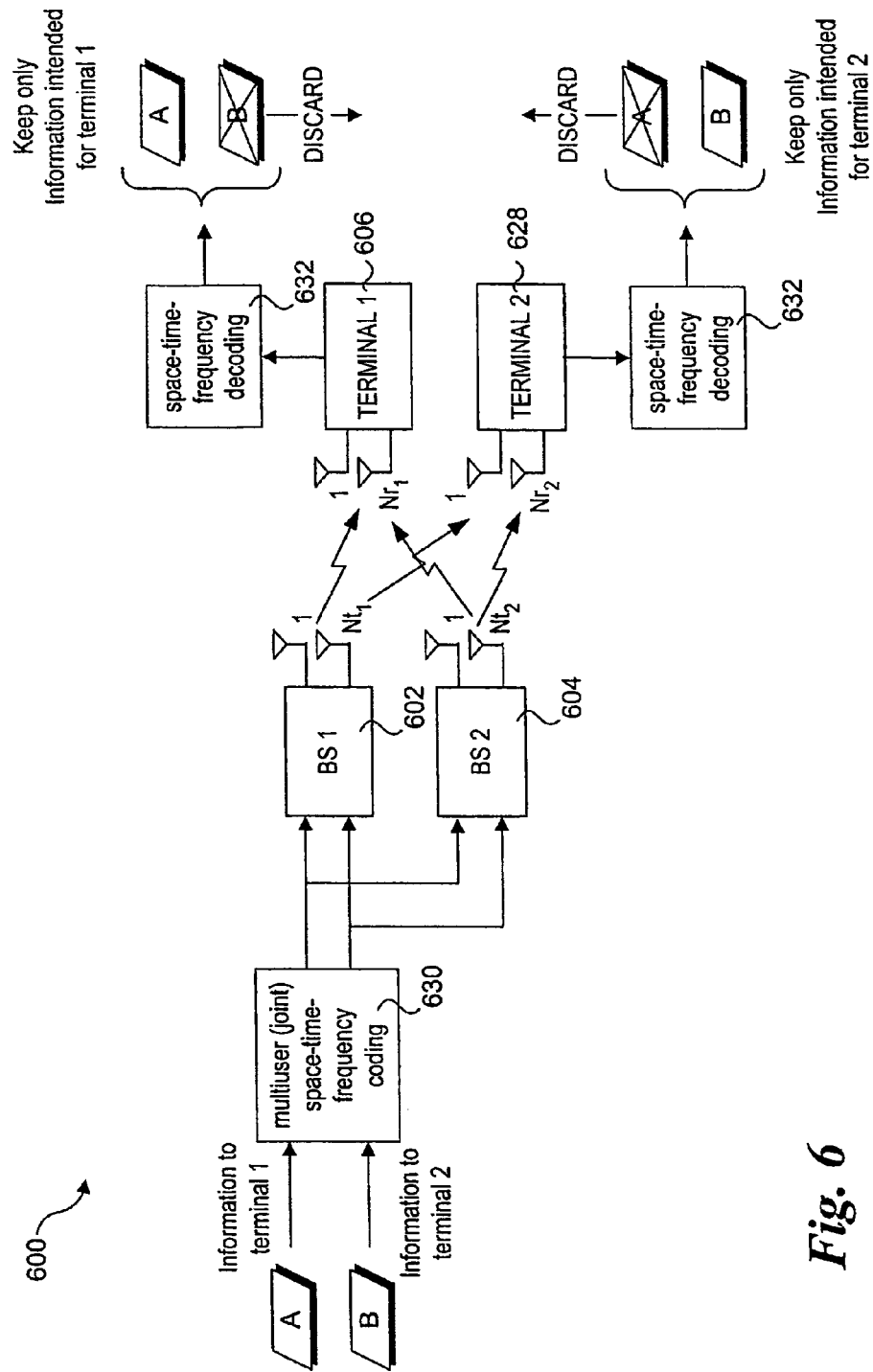
FIG. 6 shows a cooperative MIMO architecture under which two base-stations performing multiuser MIMO with two terminals simultaneously using joint encoding and decoding.

FIG. 6 depicts another multi-user cooperative MIMO architecture 600. Instead of forming nulls to un-intended terminals, information from multiple users is jointed encoded, transmitted from multiple base stations via the augmented MIMO antenna array, and then decoded at the receiving terminals. In one embodiment of the invention, the information is decoded at the user ends independently. The signals intended for other users are treated as interference. In another embodiment, the information from all users are decoded jointly. In yet another embodiment, the information received at different user locations are consolidated for joint decoding.

The embodiment of FIG. 6 shows an example of joint decoding. In this instance, information to be sent to terminals 1 (606) and 2 (628) is jointly encoded using one of space-time, space-frequency, or space-time-frequency coding in a block 630. For clarity, the respective information to be sent to terminals 1 and 2 is depicted as data A and data B. The jointly encoded output of block 630 is provided as inputs to each of base stations 602 and 604. The base stations then transmit the jointly encoded data via selected antennas (corresponding to MIMO channels assigned to terminals 1 and 2) to terminals 606 and 628. Upon receipt of the jointly encoded data, it is decoded via operations performed in a block 632 for each of terminals 606 and 628. Upon being decoded, information intended for each recipient terminal is kept, while other information is discarded. Accordingly, terminal 606 keeps data A and discards data B, while terminal 628 keeps data B and discards data A. In one embodiment, information to keep and discard is identified by packet headers corresponding to packets that are extracted from the decoded data received at a given terminal.

Figure 7A:
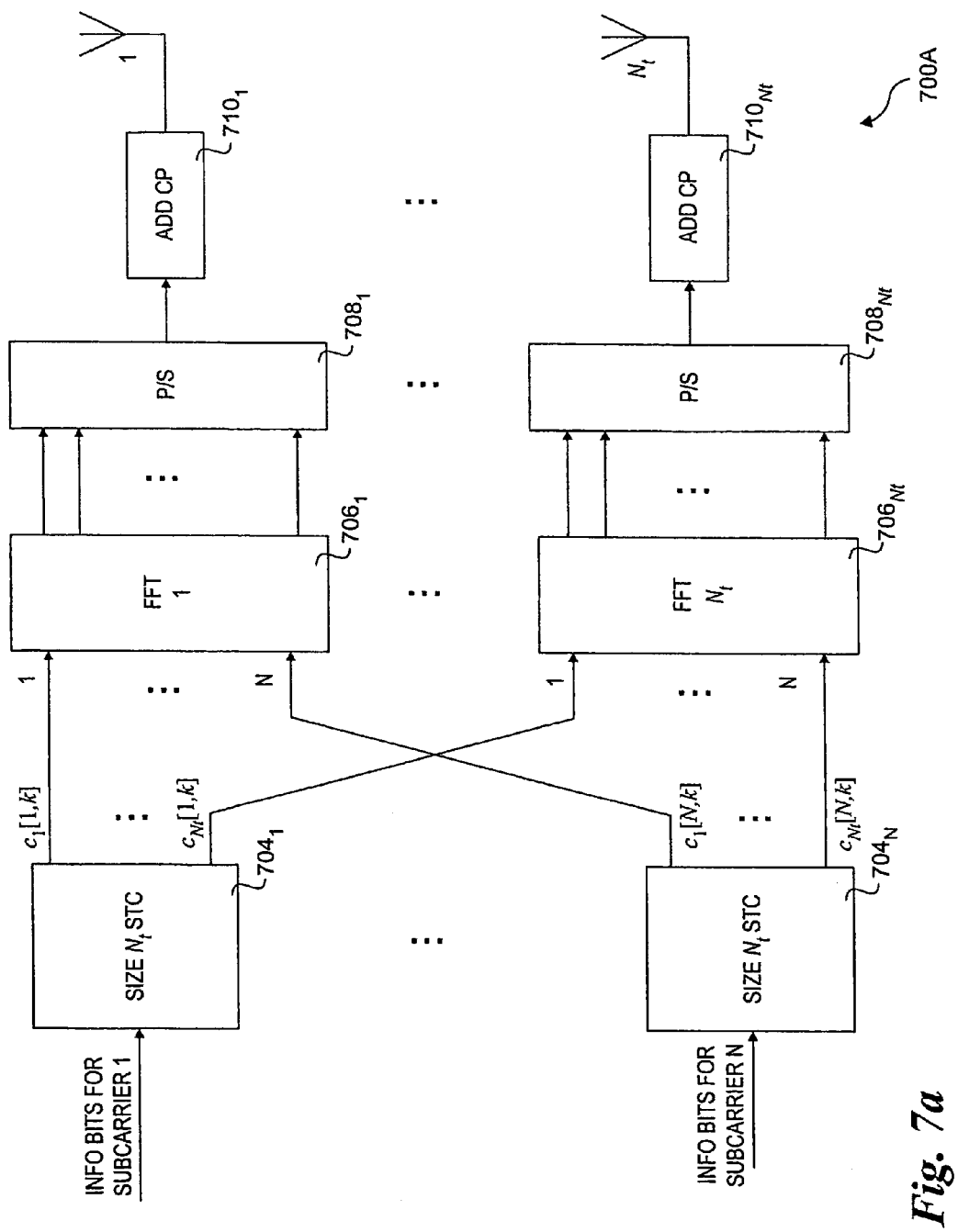
FIG. 7a shows a block diagram of an MIMO OFDM encoder/transmitter.

A block diagram corresponding to one embodiment of an OFDMA (Orthogonal Frequency Division Multiple Access) encoding/transmitter module 700A for a base station having $N_t$ transmit antennas is shown in FIG. 7a. Information bits for each of 1-N subcarriers are received at respective space-time coding (STC) blocks $704_{1-N}$. The size of the STCs is a function of the number of transmit antennas $N_t$. In general, the space-time codes may comprise space-time trellis codes (STTC), space-time block codes (STBC), as well as STTC or STBC with delay diversity, details of which are described below. Based on the applicable STC, each of blocks $704_{1-p}$ outputs a set of code words $c_1$ [j,k] to $c_{Nt}$ [j, k], wherein j represents the sub-channel index and k is the time index. Each of the code words is then forwarded to an appropriate Fast Fourier Transform (FFT) blocks $706_{1-Nt}$. The outputs of the FFT blocks $706_{1-Nt}$ are then fed to parallel to serial (P/S) conversion blocks $708_{1-Nt}$, and cyclic prefixes are added via add cyclic prefix (CP) blocks $710_{1-Nt}$. The outputs of add CP blocks $710_{1-Nt}$ are then provided to transmit antennas $1$-$N_c$ to be transmitted as downlink signals to various terminals within the base station's coverage area.

Figure 8:
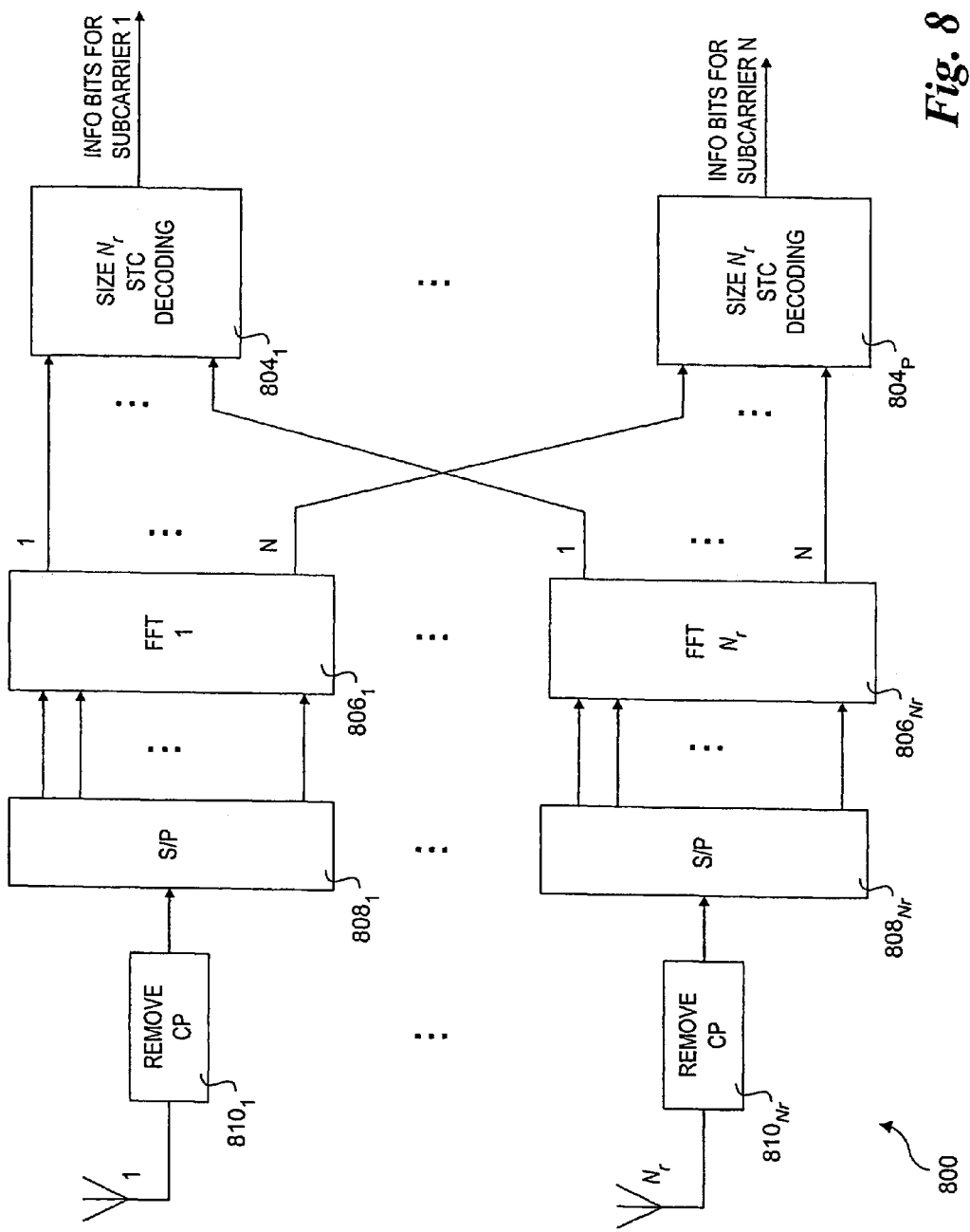
FIG. 8 shows a block diagram of an MIMO OFDM receiver/decoder.

A block diagram corresponding to one embodiment of an OFDMA receiver/decoder module 800 for a terminal having $N_r$ receive antennas is shown in FIG. 8. The signal processing at the receive end of a downlink signal is substantially the inverse of the process used for encoding and preparing the signal for transmission. First, the cyclic prefix for each of the signals received at respective receive antennas $1$-$N_r$ is removed by a respective remove CP block blocks $810_{1-Nr}$. The respective signals are then fed into respective serial-to-parallel (S/P) conversion blocks $808_{1-Nt}$ to produce parallel sets of data, which are then provided as inputs to FFT blocks $806_{1-Nr}$. The outputs of FFT blocks $806_{1-Nr}$ are then forwarded to appropriate STC decoding blocks $804_{1-N}$ for decoding. The decoded data is then output at the information bits for subcarriers 1-N.

Figure 7B:
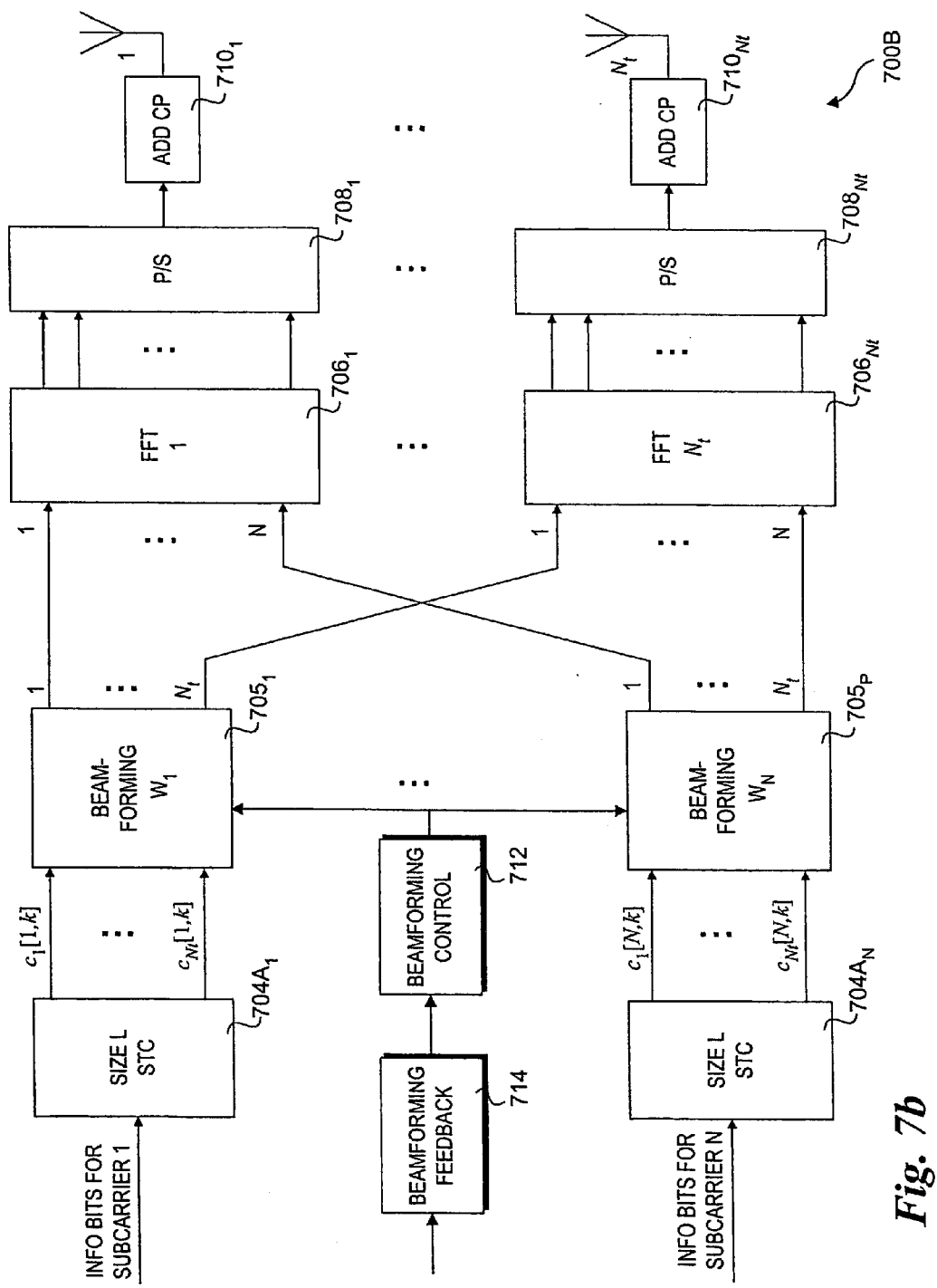
FIG. 7b shows the block diagram of an MIMO OFDM encoder/transmitter with beamforming.

A block diagram corresponding to one embodiment of an OFDMA encoding/beamforming/transmitter module 700B that performs beamforming is shown in FIG. 7b. As depicted by like-numbered blocks, much of the signal processing performed by the embodiments of FIGS. 7a and 7b is similar. In addition to these processing operations, OFDMA encoding/beamforming/transmitter module 700B further includes beamforming blocks $705_{1-N}$. Each of these beamforming blocks applies a weighted value $W_{1-N}$ to its respective inputs in view of control information provided by a beamforming control block 712, which is generated in response to beamforming feedback data 714. Further differences between the embodiments of FIGS. 7a and 7b include STC blocks $704A_{1-N}$, which now employ STCs having a size L, which represents the number of beamforming channels.

Figure 17A:
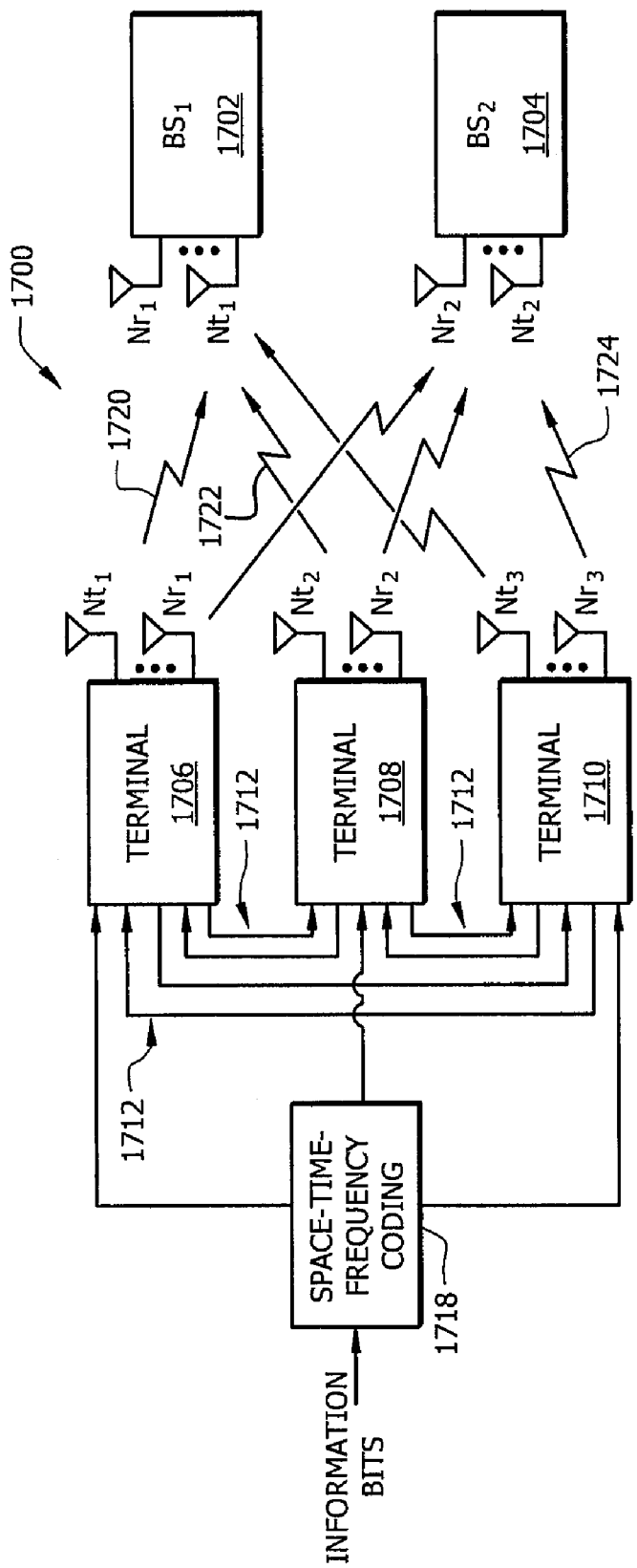
FIG. 17a shows a cooperative MIMO architecture under which antenna arrays from multiple terminals are employed in a cooperative MIMO transmission scheme to transmit uplink signals to one or more base stations.
Figure 17B:
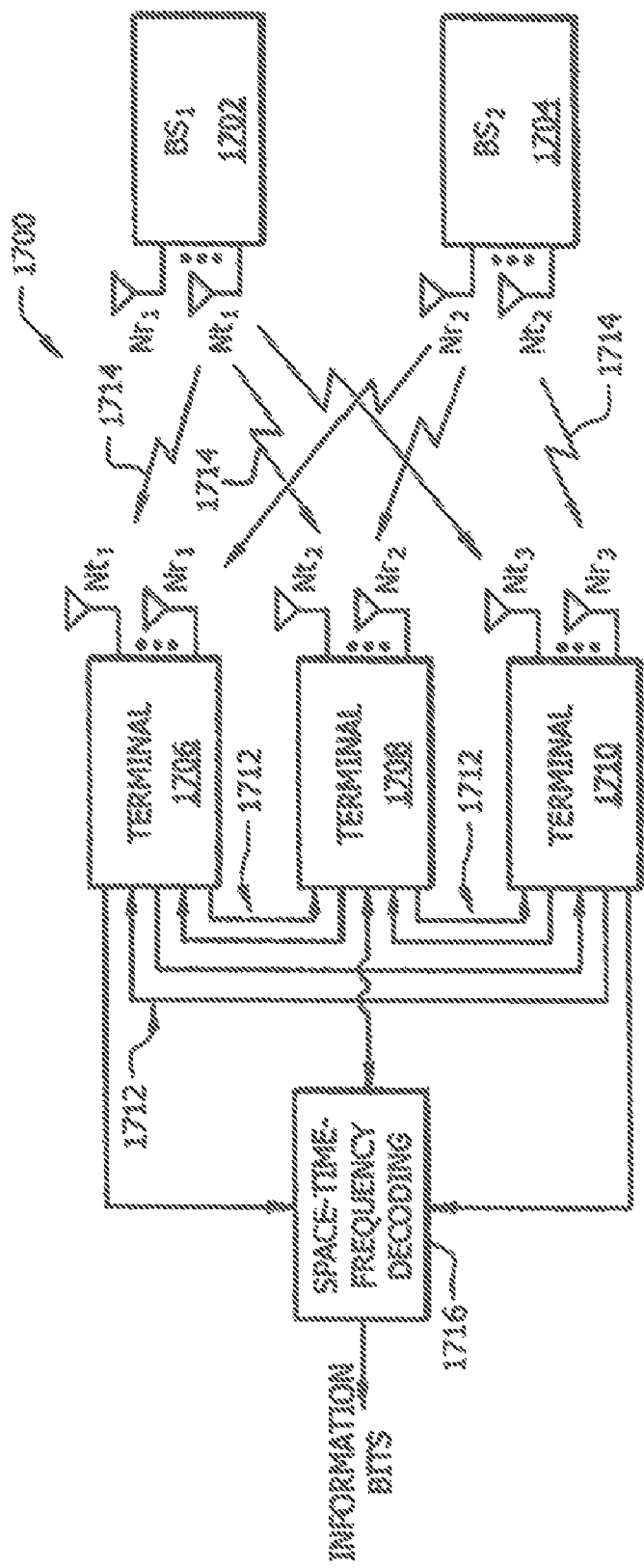
FIG. 17b shows aspects of the cooperative MIMO architecture of FIG. 17a employed for transmitting and processing downlink signals received by the augmented antenna array.

It should be appreciated that the cooperative MIMO concepts described herein, both in the downlink and the uplink, also apply at the terminal side of a network. Virtual antenna arrays at the terminals, comprising one or more antenna elements from a plurality of terminals, enable cooperative downlink reception and cooperative uplink transmission. FIGS. 17a and 17b show components of a wireless network according to various embodiments of the inventions described herein that enable terminal side cooperative MIMO applications.

FIG. 17b shows downlink signal processing aspects of cooperative MIMO architecture 1700. As shown, network 1700 comprises a plurality of terminals, e.g., terminals 1706, 1708, and 1710, each having antenna arrays where terminal 1706 has $Nt_1$ transmit antennas and $Nr_1$ receive antennas, terminal 1708 has $Nt_2$ transmit antennas and $Nr_2$ receive antennas, and terminal 1710 has $Nt_3$ transmit antennas and $Nr_3$ receive antennas. Base station 1702 has an antenna array including $Nt_1$ transmit antennas and $Nr_1$ receive antennas and base station 1704 has an antenna array including $Nt_2$ transmit antennas and $Nr_2$ Nr2 receive antennas. In view of the foregoing MIMO definitions, the cooperative use of the base station antennas increases the MIMO dimension to $(Nt_1+Nt_2+Nt_3)*(Nr_1+Nr_2+Nr_3)$.

According to a preferred embodiment, cooperative MIMO downlink reception is achieved by exchanging data between a plurality of terminals, e.g., terminals 1706, 1708, and 1710. Data exchange between terminals is executed via a short distance, high throughput radio link 1712. According to a preferred embodiment, short distance radio link 1712 is a link according to the IEEE 802.15 standard (e.g., Bluetooth), wireless USB, and the like. According to other embodiments, data may be exchanged between terminals using in-band radio communications, where, for example, one or more terminals functions as a relay.

Downlink signals, e.g., downlink signal 1714, are transmitted from base stations 1702 and/or base station 1704 via selected transmit antennas among available transmit antennas at each of base station 1702 and base station 1704, i.e., $1$-$Nt_1$ transmit antennas at base station 1702 and $1$-$Nt_2$ transmit antennas at 1704. Downlink signal 1714 is received by the receive antenna arrays ($1$-$Nr_1$, $1$-$Nr_2$, $1$-$Nr_3$) for terminals 1706, 1708, and 1710, respectively. As discussed above, it should be appreciated that the same antennas may be used for both transmit and receive operations for some embodiments, while separate sets of transmit and receive antennas may be employed for other embodiments.

Upon being received at the terminals, initial signal processing is performed on the downlink signals at terminals 1706, 1708, and 1710, and the processed signals are forwarded to a block 1716 to perform joint MIMO decoding and demodulation, thus extracting the information bits corresponding to the data transmitted by base stations 1702 and/or 1704. According to a preferred embodiment, the components for performing the operations of block 1716 are located at each terminal; that is, decoder 1716 is co-located at each terminal. In such case decoder 1716 decodes only bit streams targeted for the specific terminal at which it is located. This is accomplished using signals from its own antennas as well as antenna signals exchanged from other terminals. In another embodiment, the components for performing the operations of block 1716 may be implemented in a master decoder that is centrally located with respect to multiple terminals (e.g., 1706, 1708, and 1710), or may be co-located at one of the terminals.

According to another embodiment of the invention described herein, one or more terminals receives downlink signals, determines whether the downlink signals comprise cooperative MIMO signals or signals from a single base station, and decodes the received signals according to that determination. In such case, decoding may be performed at the receiving terminal or performed at centralized location, e.g., a centralized master decoder.

FIG. 17a depicts a block diagram of one embodiment of an uplink cooperative MIMO architecture 1700. Similar to downlink concepts discussed herein, cooperative MIMO uplink concepts are particularly useful in cases where there is a weak signal path between a base station and a first terminal. In such case, a second, cooperative terminal having a strong signal path between the base station is used to relay signals between the first terminal and the base station. As a practical matter, this is likely to occur where the first terminal is subject to severe channel fading while a second terminal is not, or where is a clear line of sight between the second terminal and base station, but not between the first terminal and the base station.

For illustrative purposes, the architecture shown in FIG. 17a include two base stations 1702 and 1704 and terminals 1706, 1708, and 1710. In the illustrated embodiment of FIG. 17a, terminal 1706 has an antenna array including $Nt_1$ transmit antennas, terminals 1708 has an antenna array including $Nt_2$ transmit antennas, and terminal 1710 has an array including $Nt_3$ transmit antennas. Base station 1702 includes $Nr_1$ receive antennas and base station 1704 includes $Nr_2$ receive antennas. In view of the foregoing MIMO definitions, the cooperative use of the terminal antennas increases the MIMO dimension to $(Nt_1+Nt_2+Nt_3)*(Nr_1+Nr_2)$. This increase in dimension is accomplished without requiring any additional antenna elements at the terminals, as well as the components use to drive the antennas.

According to aspects of various embodiments of the invention described herein, an information bit sequence corresponding to data to be transmitted to a base station may be space-time, space-frequency, or space-time-frequency coded, as depicted by a block 1718 in FIG. 17*a*. Space-time, space-frequency, or space-time-frequency codes may be augmented to support delay diversity. After appropriate encoding is performed in block 1718, the coded data is then passed to the terminals, whereupon it is transmitted via applicable antenna elements at those terminals. The terminals then perform joint MIMO transmissions (depicted as signals 1720, 1722, and 1724) towards the base stations in view of applicable MIMO channel configuration parameters. For example, signals 1720, 1722, and 1724 transmitted from terminals 1706, 1708, and 1710 may employ selected antenna elements for each of the base stations based on the coding scheme and/or MIMO scheme that is currently employed for a particular base station. In general, cooperative MIMO transmissions can be performed during regular communication, or during handoff, where a terminal moves across the boundary between cells.

In one embodiment, space-time coding is employed. For example, incoming information bits are space-time coded (using e.g., space-time block or trellis codes) at block 1718, and the encoded data are forwarded to each of terminals 1706, 1708, and 1710. Further details of space-time block encoding and the use of space-time trellis codes are discussed below.

In one embodiment, the space-time (or space-frequency, or space-time-frequency) coding is performed at a master encoder. In another embodiment, the space-time (or space-frequency, or space-time-frequency) is performed at separate locations (e.g., separate from each terminal, but typically co-located at a particular terminal) based on a common (replicated) information bit sequence received at each of the separate locations.

It should be further appreciated that augmented antenna arrays can be used in uplink communications by employing the beamforming techniques described above with respect to downlink communications. Likewise, the techniques known for steering transmitted signals toward selected locations, while transmitted signals sent toward other directions are nullified due to signal canceling effects and/or fading effects may be fully employed for transmission from terminals to base stations. Similar to the discussion above, it may be necessary to employ signal synchronization between multiple terminals to obtain the desired beamforming results.

Figure 18:
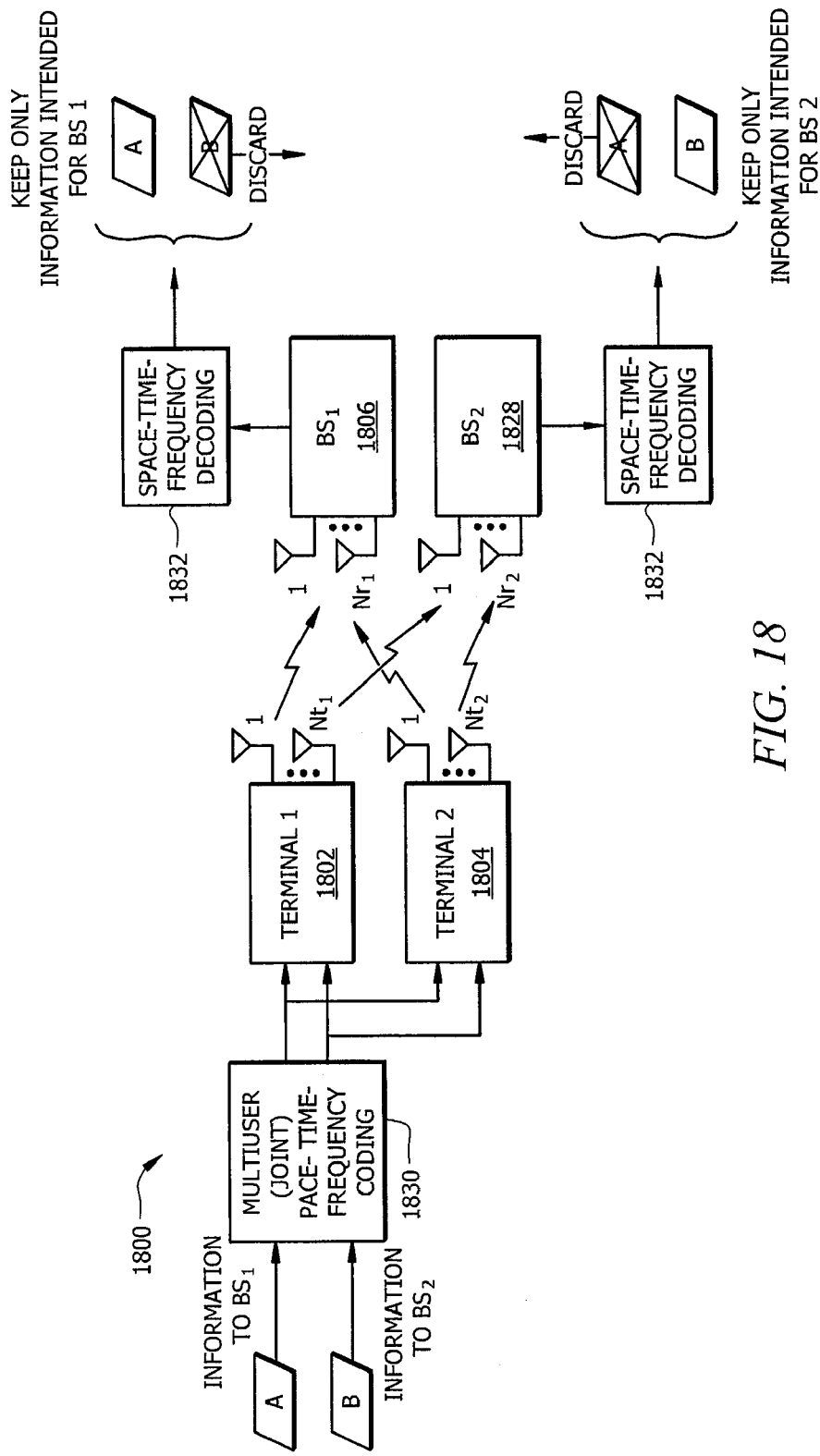
FIG. 18 shows a cooperative MIMO architecture under which multiple terminals perform multiuser MIMO with multiple base stations simultaneously using joint encoding and decoding.

FIG. 18 depicts cooperative MIMO architecture 1800 for uplink transmissions. Information from multiple terminals is jointly encoded, transmitted from multiple terminals via the augmented MIMO antenna array, and then decoded at the receiving base stations. In one embodiment of the invention, the information is decoded at the base stations independently. The signals received at a base station but intended for another base station is treated as interference. In another embodiment, the information from all terminals is decoded jointly at the base stations. In yet another embodiment, the information received at different base stations is consolidated for joint decoding.

The embodiment of FIG. 18 shows an example of joint decoding. In this instance, information to be sent to multiple base stations, e.g., base station 1806 and 1828, is jointly encoded using one of space-time, space-frequency, or space-time-frequency coding in a block 1830. For clarity, the respective information to be sent to base station 1806 and 1828 is depicted as data A and data B. The jointly encoded output of block 1830 is provided as inputs to each of base stations 1806 and 1828. The terminals then transmit the jointly encoded data via selected antennas (corresponding to MIMO channels assigned to respective base stations) to base stations 1806 and 1828. Upon receipt of the jointly encoded data, it is decoded via operations performed in a block 1832 for each of base stations 1806 and 1828. Upon being decoded, information intended for each recipient base station is kept, while other information is discarded. Accordingly, base station 1806 keeps data A and discards data B, while base station 1828 keeps data B and discards data A. In one embodiment, information to keep and discard is identified by packet headers corresponding to packets that are extracted from the decoded data received at a given base station.

Figure 19A:
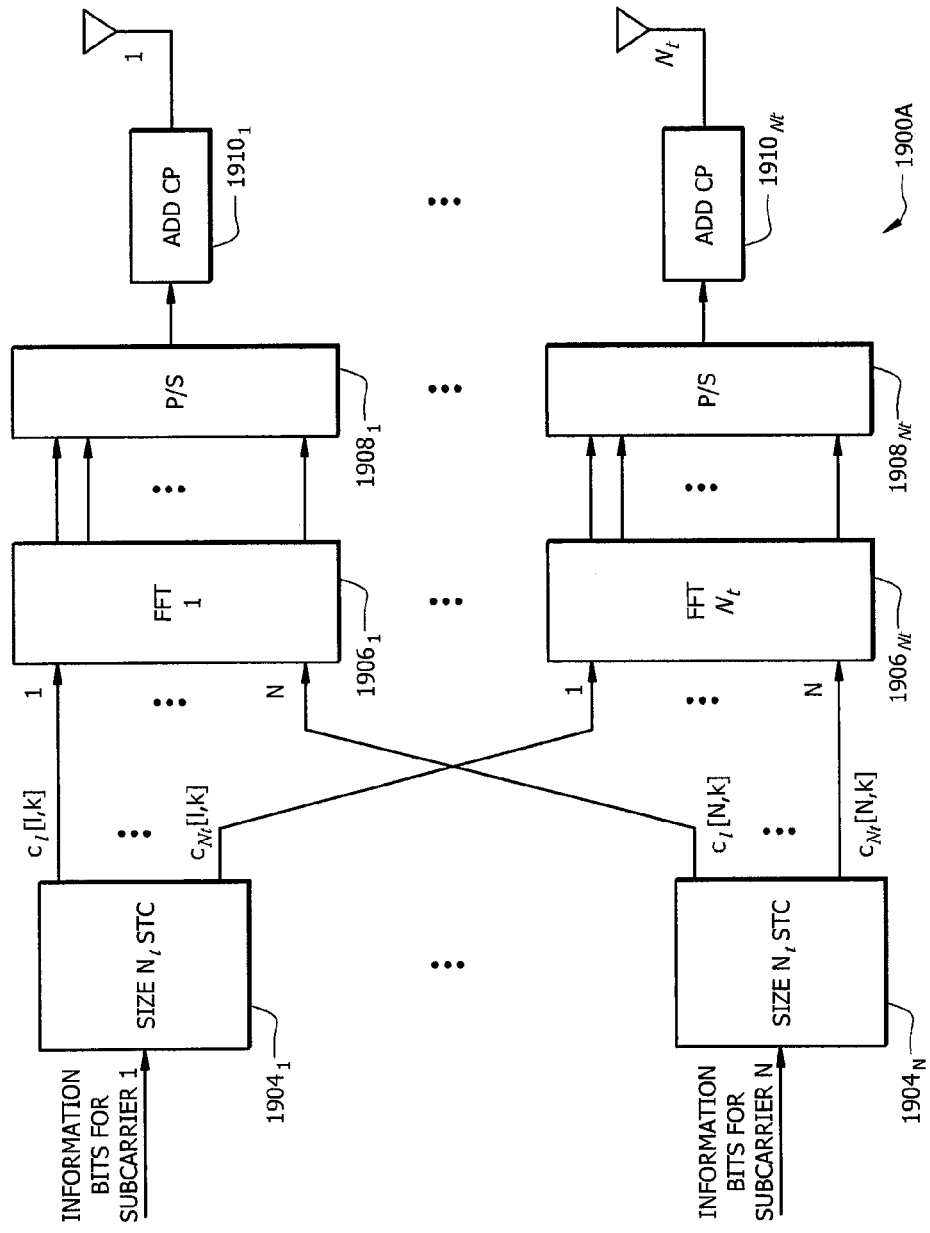
FIG. 19a shows a block diagram of another MIMO OFDM encoder/transmitter.

A block diagram corresponding to one embodiment of an OFDMA (Orthogonal Frequency Division Multiple Access) encoding/transmitter module 1900A for a terminal having $N_t$ transmit antennas is shown in FIG. 19*a*. Information bits for each of 1-N subcarriers are received at respective space-time coding (STC) blocks $1904_{1-N}$. The size of the STCs is a function of the number of transmit antennas $N_t$. In general, the space-time codes may comprise space-time trellis codes (STTC), space-time block codes (STBC), as well as STTC or STBC with delay diversity, details of which are described below. Based on the applicable STC, each of blocks $1904_{1-p}$ outputs a set of code words $c_1[j,k]$ to $c_{Nt}[j,k]$, wherein j represents the sub-channel index and k is the time index. Each of the code words is then forwarded to an appropriate Fast Fourier Transform (FFT) blocks $1906_{1-Nt}$. The outputs of the FFT blocks $1906_{1-Nt}$ are then fed to parallel to serial (P/S) conversion blocks $1908_{1-N}$, and cyclic prefixes are added via add cyclic prefix (CP) blocks $1910_{1-Nt}$. The outputs of add CP blocks $1910_{1-Nt}$ are then provided to transmit antennas 1-$N_t$ to be transmitted as uplink signals to various basestations for which the terminal is communicating.

Figure 20:
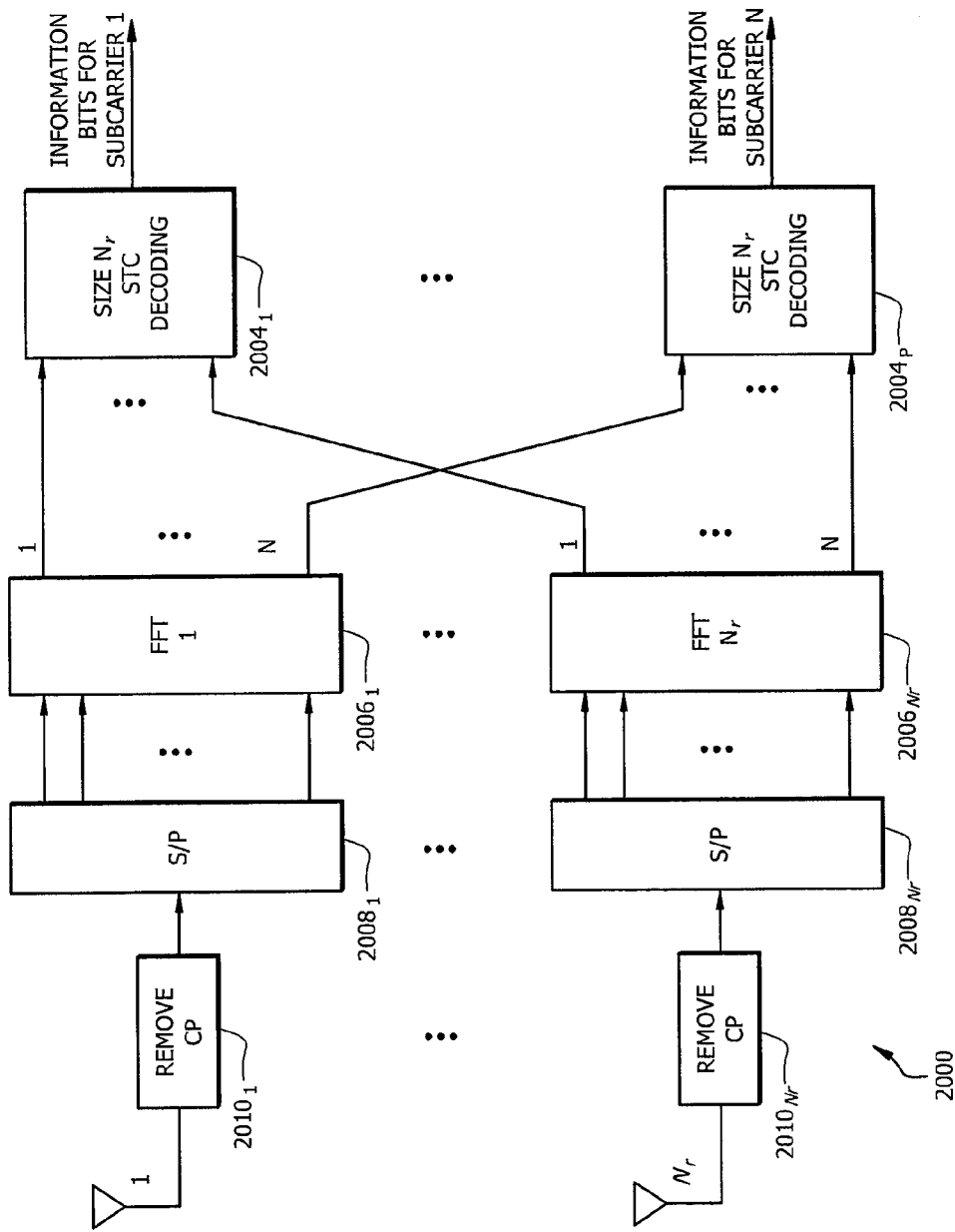
FIG. 20 shows a block diagram of another MIMO OFDM receiver/decoder.

A block diagram corresponding to one embodiment of an OFDMA receiver/decoder module 2000 for a base station having $N_r$ receive antennas is shown in FIG. 20. The signal processing at the receive end of an uplink signal is substantially the inverse of the process used for encoding and preparing the signal for transmission. First, the cyclic prefix for each of the signals received at respective receive antennas 1-$N_r$ is removed by a respective remove CP block blocks $2010_{1-Nr}$. The respective signals are then fed into respective serial-to-parallel (S/P) conversion blocks $2008_{1-Nt}$ to produce parallel sets of data, which are then provided as inputs to FFT blocks $2006_{1-Nr}$. The outputs of FFT blocks $2006_{1-Nr}$ are then forwarded to appropriate STC decoding blocks $2004_{1-N}$ for decoding. The decoded data is then output at the information bits for subcarriers 1-N.

Figure 19B:
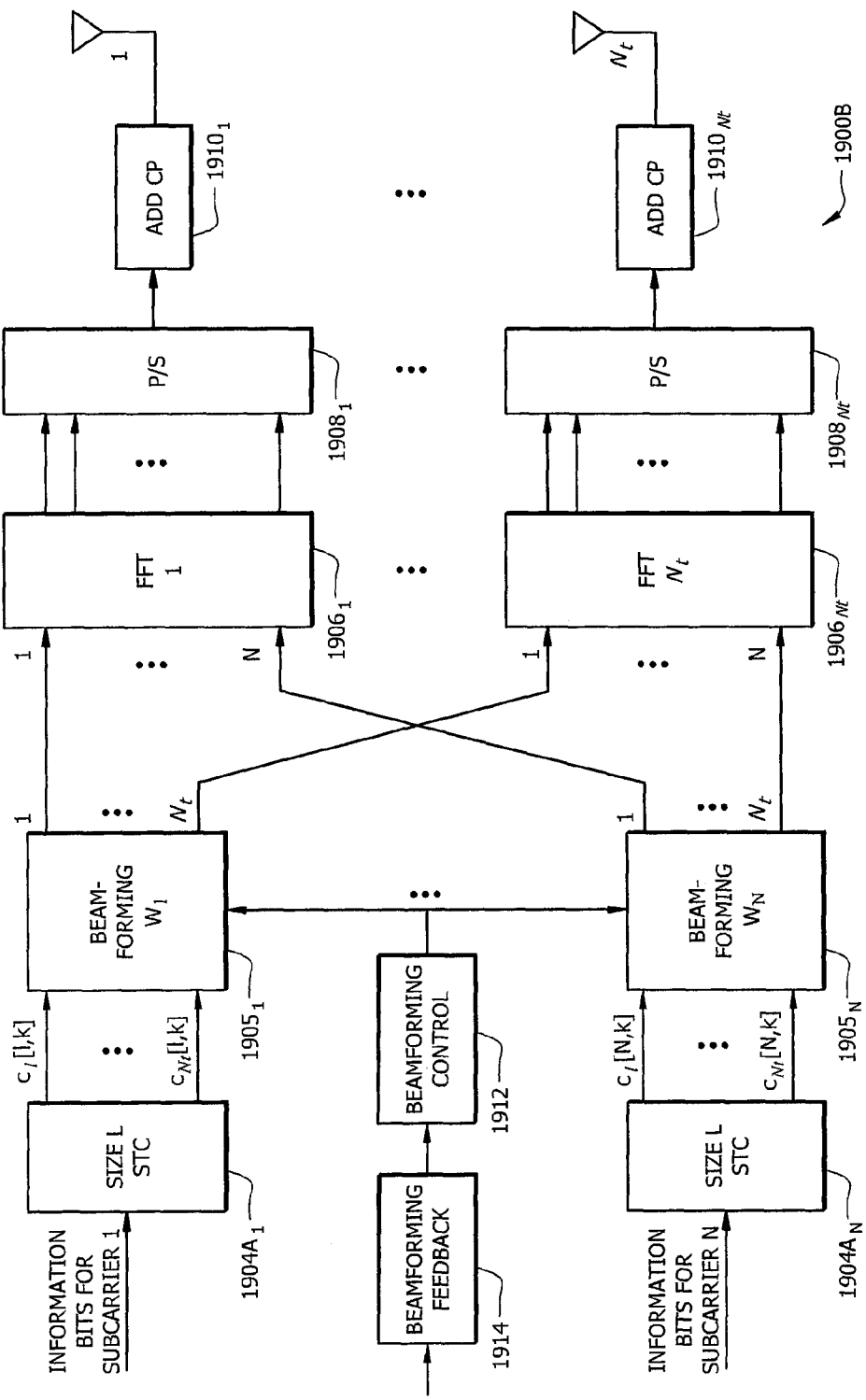
FIG. 19b shows the block diagram of another MIMO OFDM encoder/transmitter with beamforming.

A block diagram corresponding to one embodiment of an OFDMA encoding/beamforming/transmitter module 1900B that performs uplink beamforming is shown in FIG. 19*b*. As depicted by like-numbered blocks, much of the signal processing performed by the embodiments of FIGS. 19*a* and 19*b* is similar. In addition to these processing operations, OFDMA encoding/beamforming/transmitter module 1900B further includes beamforming blocks $1905_{1-N}$. Each of these beamforming blocks applies a weighted value $W_{1-N}$ to its respective inputs in view of control information provided by a beamforming control block 1912, which is generated in response to beamforming feedback data 1914. Further differences between the embodiments of FIGS. 19*a* and 19*b* include STC blocks $1904A_{1-N}$, which now employ STCs having a size L, which represents the number of beamforming channels.

Space Time Encoding.

Space-Time Codes (STC) were first introduced by Tarokh et al. from AT&T research labs (V. Tarokh, N. Seshadri, and A. R. Calderbank, Space-time codes for high data rates wireless communications: Performance criterion and code construction," IEEE Trans. Inform. Theory, vol. 44, pp. 744-765, 1998) in 1998 as a novel means of providing transmit diversity for the multiple-antenna fading channel. There are two main types of STCs, namely space-time block codes (STBC) and space-time trellis codes (STTC). Space-time block codes operate on a block of input symbols, producing a matrix output whose columns represent time and rows represent antennas. Space-time block codes do not generally provide coding gain, unless concatenated with an outer code. Their main feature is the provision of full diversity with a very simple decoding scheme. On the other hand, space-time trellis codes operate on one input symbol at a time, producing a sequence of vector symbols whose length represents antennas. Like traditional TCM (trellis coded modulation) for a single-antenna channel, space-time trellis codes provide coding gain. Since they also provide full diversity gain, their key advantage over space-time block codes is the provision of coding gain. Their disadvantage is that they are difficult to design and generally require high complexity encoders and decoders.

Figure 9:
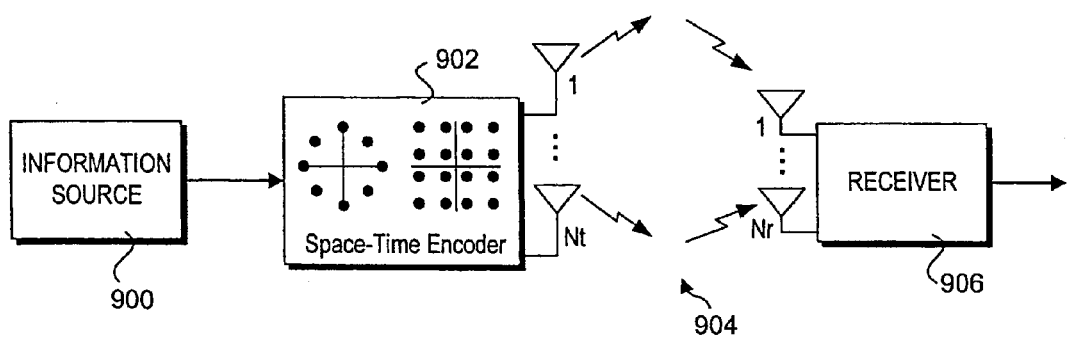
FIG. 9 shows a block diagram used to model a space-time coding transmission.

FIG. 9 shows a block diagram of as STC MIMO transmission model. Under the model, data from an information source 900 is encoded using a STBC or STTC code by a space-time encoder 902. The encoded data is then transmitted over a MIMO link 904 to a receiver 906. The received signals are then decoded at the receiver to extract the original data.

Figure 11:
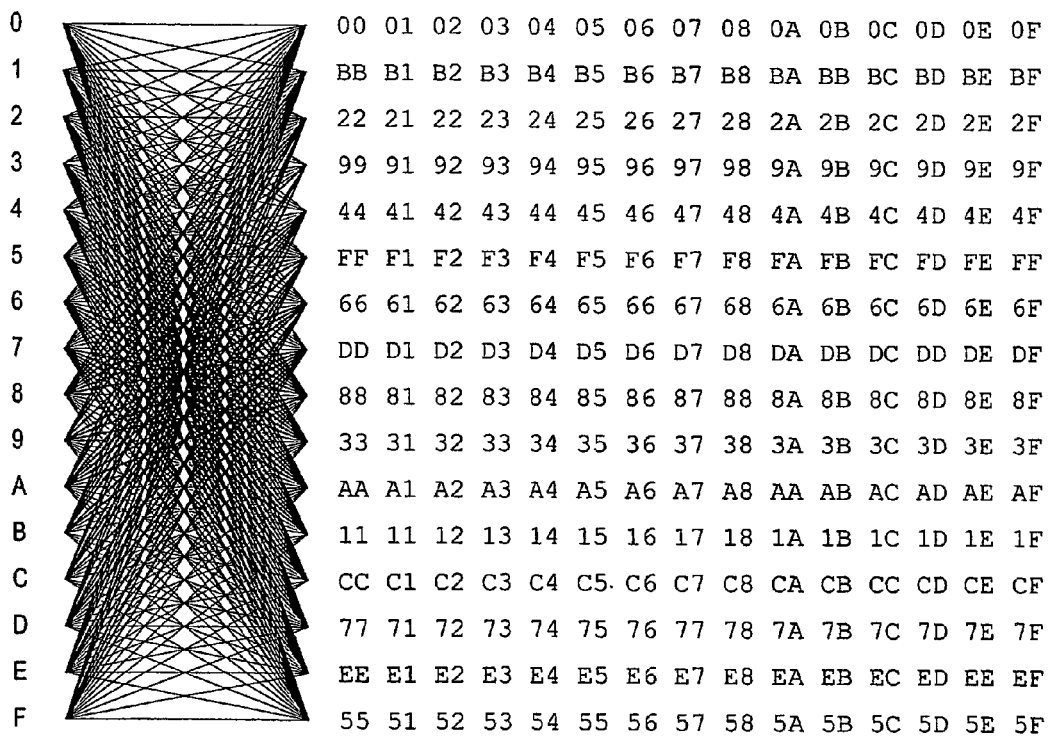
FIG. 11 shows an exemplary QAM-based STTC encoder.

An exemplary 8-PSK 8-state space-time trellis code for two antennas is shown in FIG. 10, while an exemplary 16-QAM 16-state STTC for two antennas is shown in FIG. 11. The encoding for STTCs are similar to TCM, except that at the beginning and the end of each frame, the encoder is required to be in the zero state. At each time t, depending on the state of the encoder and the input bits, a transition branch is selected. If the label of the transition branch is $c_1^t; c_2^t: : : ; c_n^t$, then transmit antenna i is used to send the constellation symbols $c_i^t$, i=1; 2; : : : ; n and all these transmissions are in parallel. In general, an STTC encoder may be implemented via a state machine programmed with states corresponding to the trellis code that is to be implemented.

Figure 12:
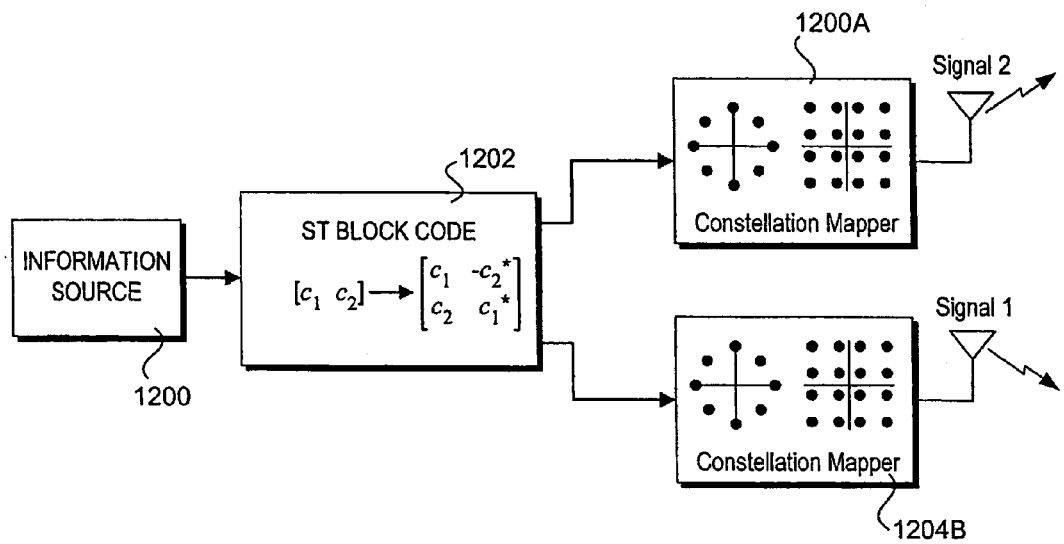
FIG. 12 shows a block diagram used to model a space-time block coding (STBC) transmission scheme.

FIG. 12 shows a block diagram corresponding to an STBC model employing two antennas. As before, data is received from an information source 1200. Space time block encoding is then performed by the operations of space time block code 1202 and constellation maps 1204A and 1204B.

In further detail, an STBC is defined by a pxn transmission matrix G, whose entries are linear combinations of $x_i; : : : ; x_k$ and their conjugates $x_1^*; : : : ; x_k^*$, and whose columns are pairwise-orthogonal. In the case when p=n and $\{x_i\}$ are real, G is a linear processing orthogonal design which satisfies the condition that $G^T G = D$ where D is a diagonal matrix with the (i;i)th diagonal element of the form $(l_1^i x_1^2 + l_2^i x_2^2 + \ldots + l_n^i x_n^2)$ with the coefficients $l_1^i, l_2^i, \ldots l_n^i > 0$. An example of a 2x2 STBC code is shown in FIG. 12.

Figure 13A:
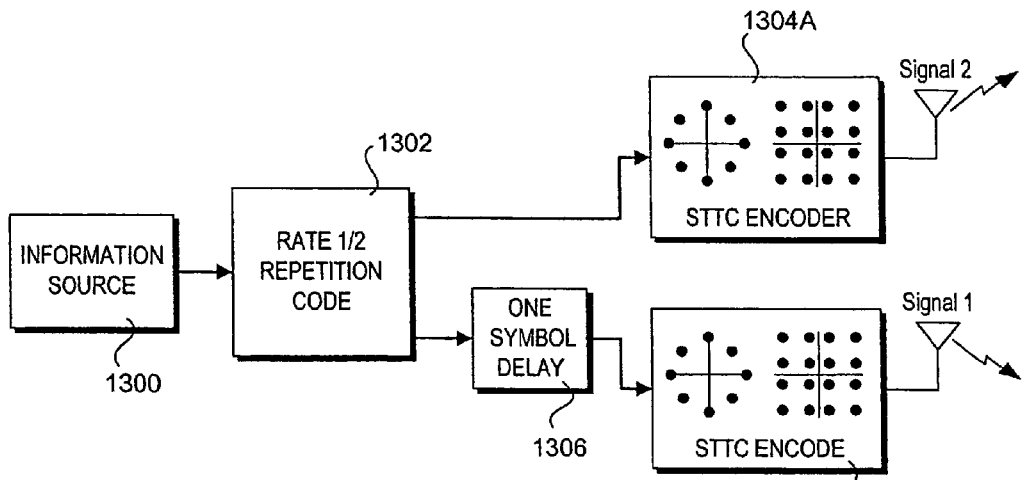
FIG. 13a shows a block diagram modeling an STTC delay diversity scheme.

Another signal diversity scheme is to employ a combination of STC with delay. For example, FIGS. 13a and 13b respectively show models corresponding to an STTC with delay transmission scheme and an STBC with delay transmission scheme. In FIG. 13a, data from an information source 1300 is received by a code repetition block 1302, which produces a pair of replicated symbol sequences that are generated in view of the data. A first sequence of symbols is forwarded to an STTC encoder 13 04A for encoding. Meanwhile, the replicated sequence of symbols is fed into a delay block 1306, which produces a one-symbol delay. The delayed symbol sequence output of delay block 1306 is then forwarded to STTC encoder 1304B for encoding. An exemplary 8-PSK 8-state delay diversity code for two antennas is shown in FIG. 14. As illustrated, the symbol sequence for transmission antenna Tx2 is synchronized with the input sequence, while the symbol sequence for transmission antenna Tx1 is delayed by one symbol.

Figure 13B:
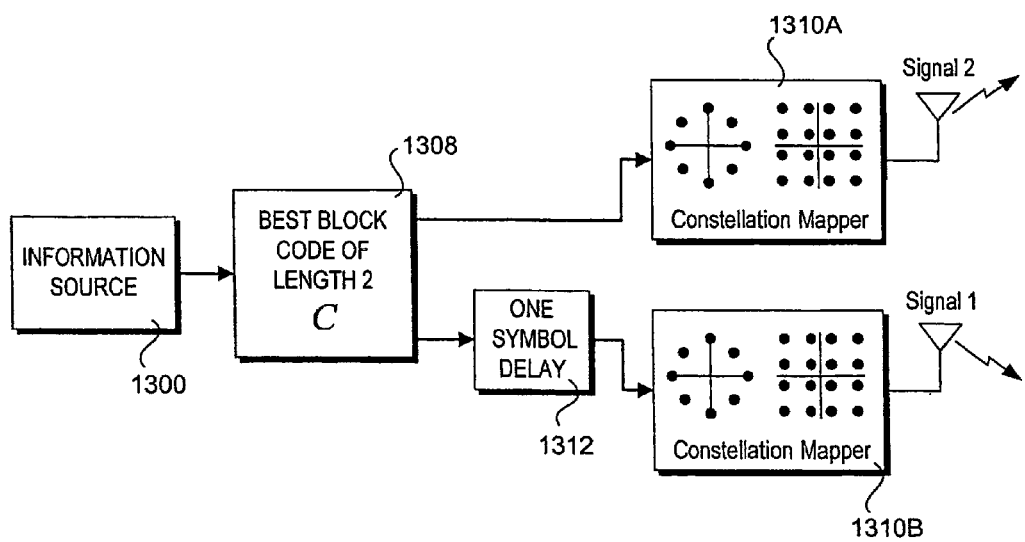
FIG. 13b shows a block diagram modeling an STBC delay diversity scheme.

Under the signal diversity scheme of FIG. 13b, data from information source 1300 is received at best block code selection logic 1308, which outputs replicated block codes to produce two block code sequences. The first block code sequence is forwarded to constellation mapper 1310A for encoding, while the second block code sequence is delayed by one symbol via a delay block 1312 and then forwarded to constellation mapper 1310B for encoding. The encoded signals are then transmitted via first and second transmit antennas.

The foregoing STTC and STBC schemes are depicted herein in accordance with conventional usage for clarity. Under such usage, the various encoded signals are transmitted using multiple antennas at the same transmitter, e.g., a single base station. In contrast, embodiments of the invention employ selective antenna elements in antenna arrays from multiple transmitters, e.g., multiple base stations and/or multiple terminals to form an augmented MIMO antenna array.

In order to implement an STC transmission scheme using multiple transmitters, additional control elements may be needed. For example, if the transmitters are located at different distances from a master encoder facility, there may need to be some measure to synchronize the antenna outputs in order to obtain appropriate MIMO transmission signals. Likewise, appropriate timing must be maintained when implementing a delay diversity scheme using antenna arrays at transmitters at different locations.

Figure 15:
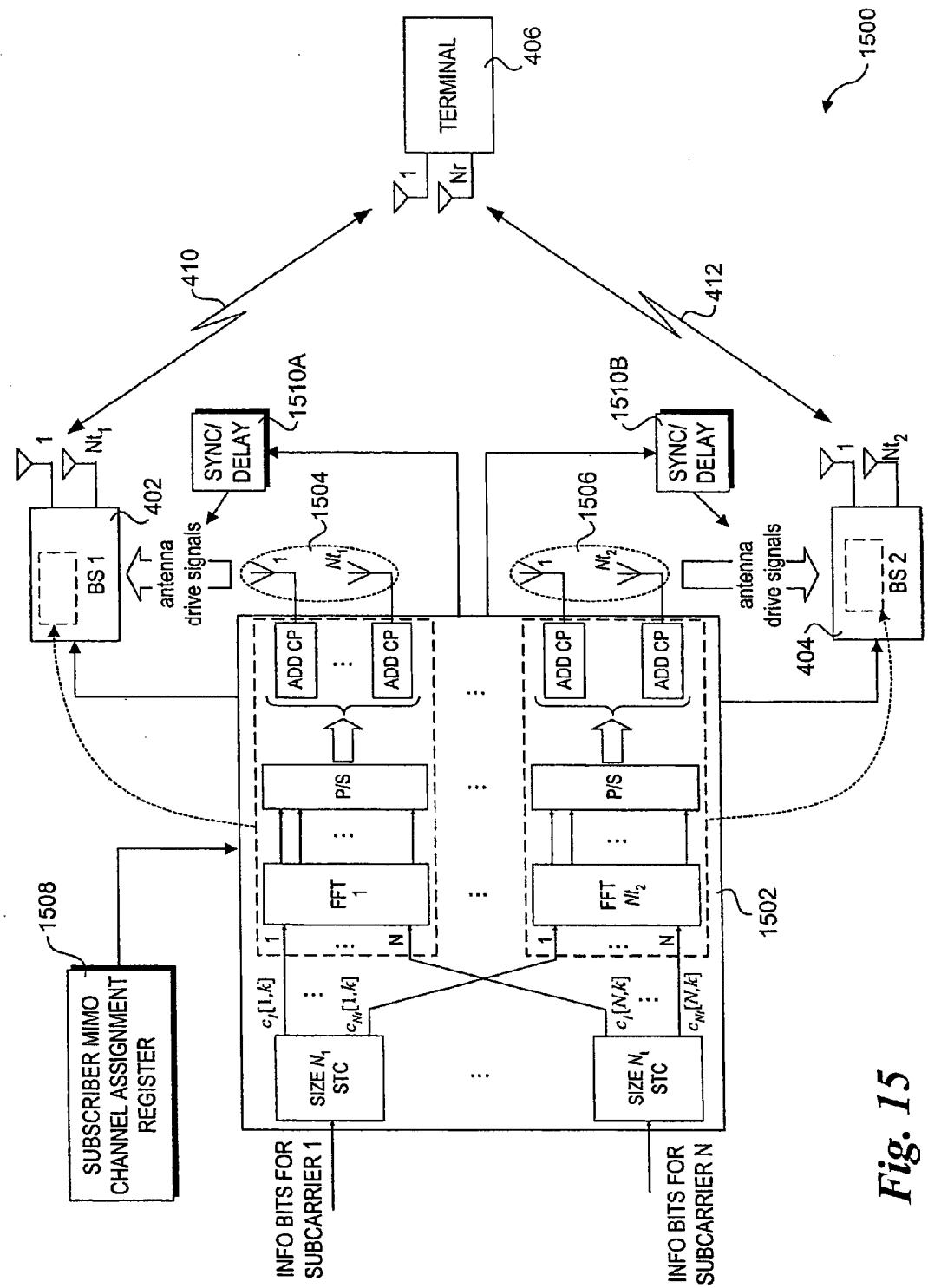
FIG. 15 is a schematic diagram illustrating a cooperative MIMO architecture under which STC encoding operations are performed at a master encoder.

FIG. 15 shows an example cooperative MIMO architecture 1500 that employs a master encoder 1502 serving base stations 402 and 404. However, it should be appreciated that a master encoder could also serve multiple terminals, e.g., 1706, 1708, etc. In general, the master encoder 1502 may be located at a separate facility from base stations or terminals, or may be co-located with one of the base stations or terminals. In respective embodiments, master encoder 1502 performs STC encoding and signal processing operations similar to the operations performed by the OFDMA encoding/transmitter module 700A of FIG. 7A (as depicted in FIG. 15) or OFDMA encoding/beamforming/transmitter module 700B of FIG. 7B. However, the transmission output are not fed directly to the transmission antennas, since the transmission antennas for at least one of the base stations or terminals will be located at a separate facility. Rather, master encoder 1502 produces respective sets of antenna drive signals 1504 and 1506 for base stations 402 and 404. Upon receipt of the antenna drive signals, corresponding downlink signals are transmitted by selected antennas hosted by base stations 402 and 404 based on the different MIMO channels supported by the system. Control inputs to master encoder 1502 corresponding to the MIMO channels are provided by a subscriber MIMO channel assignment register 1508.

If necessary, signal synchronization is performed by one or more sync/delay blocks 1510. According to the example embodiment of FIG. 15, two sync/delay blocks 1510A and 1510B are shown, with each being employed at a respective base station. In other embodiments, some base stations or terminals may not require a delay block, particularly if a co-located master encoder is employed. In general, the sync/delay blocks for a system are employed to synchronize the antenna signals or synchronize the delay of antenna signals (when delay diversity is employed).

Signal synchronization may be performed in any number of ways using principles known in the communication arts. For example, in one embodiment separate timing signals or sequences are provided to each of the base stations in a cooperative MIMO system. The timing signals or sequences contain information from which corresponding antenna drive signals may be synchronized. To perform such synchronization, each sync/delay blocks add an appropriate delay to its antenna signals. Synchronization feedback information may also be employed using well-known techniques.

Under one embodiment of a variation of architecture 1500, antenna signal processing operations corresponding to the FFT, P/S, and add CP blocks are implemented at the respective base stations or respective terminals. In this instance, STC code sequences are provided to each of the base stations or terminals, with further antenna signal processing being performed at the base stations or terminals. Under this approach, timing signals or the like may be embedded in the data streams containing the code sequences.

Figure 16:
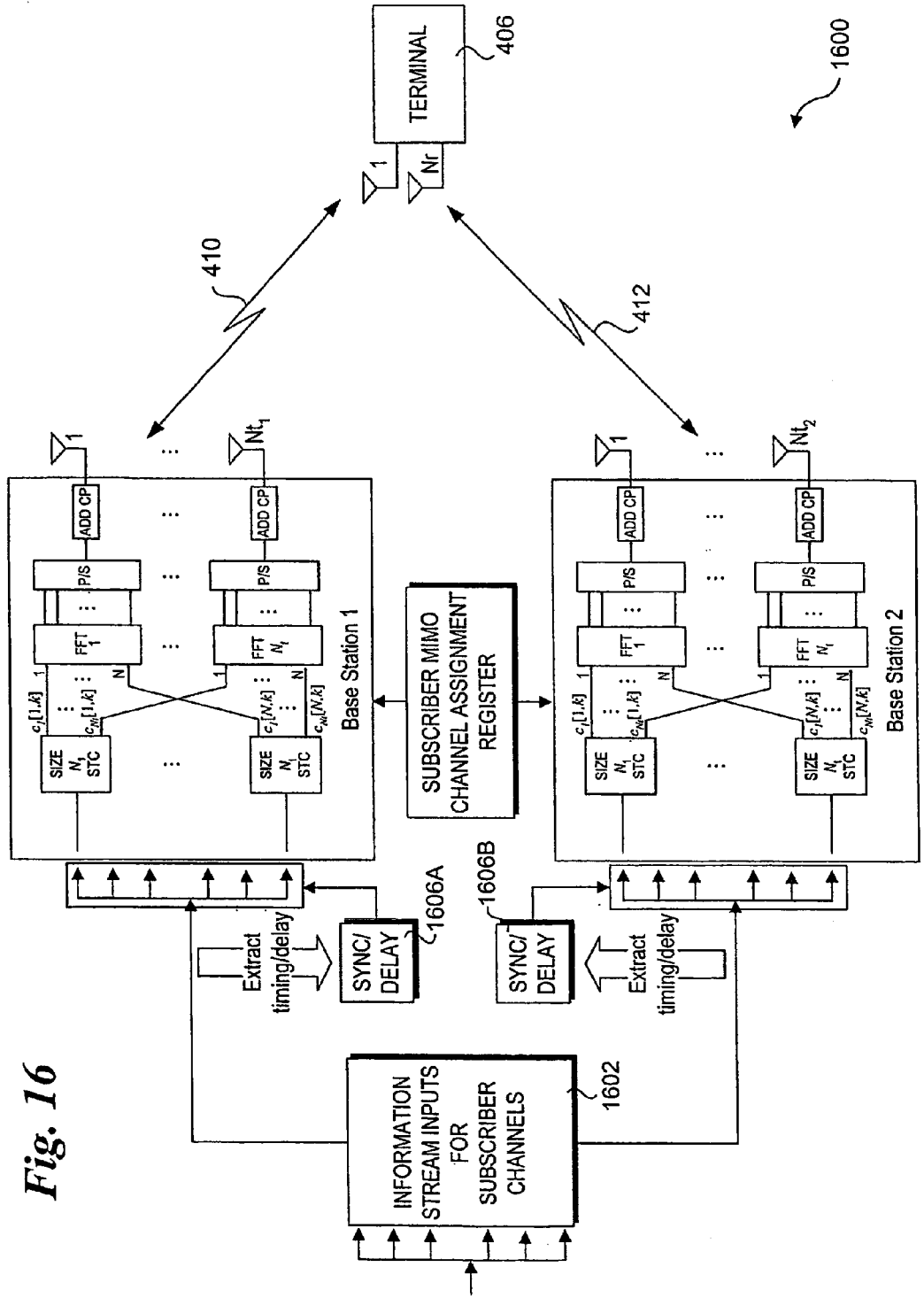
FIG. 16 is a schematic diagram illustrating a cooperative MIMO architecture under which STC encoding operations are performed on respective instances of replicated data streams at multiple base stations.

Another approach for implementing an cooperative MIMO system is depicted by cooperative MIMO architecture 1600 in FIG. 16. Under this architecture, replicated instances of input information streams for multiple channel subscribers are generated by a block 1602 and provided to each of the base stations used to form the augmented MIMO antenna array. In this case, the STC encoding and signal processing operations are performed at each base station in a manner similar to that described with respect to the OFDMA encoding/transmitter module 700A of FIG. 7A (as depicted in FIG. 16) or OFDMA encoding/beamforming/transmitter module 700B of FIG. 7B. Again, however, it should be appreciated that architecture 1600 can also be implemented at the terminal side of a network, where input information streams generated by a block 1602 would be provided to each terminal and used to form an augmented MIMO antenna array.

In one embodiment, subscriber MIMO channel information is embedded in the input data streams received at each base station. Accordingly, there is a need to determine which antenna elements are used to support each MIMO channel. This information is stored in a subscriber MIMO channel register 1604, and is used to control signal processing in a collaborative manner at the base stations.

As before, there may be a need to synchronize the antenna signals. For example, if the components used to perform the operations of block 1602 are located at different distances from the base stations, the input streams will be received at different times. In response, the corresponding antenna signals will be generated at different times. To address this situation, one or more sync/delay blocks 1606 may be employed (e.g., as depicted by sync/delay blocks 1606A and 1606B in FIG. 16B. In one embodiment, timing signals are encoded in the input data streams using one of many well-known schemes. The timing signals, which may typically comprise timing frames, timing bits, and/or timing sequences, are extracted by 1606A and 1606B. In view of the timing information, a variable delay is applied by sync/delay block for the data streams that are received earlier, such that at the point the data streams are ready received at the STC blocks, they have been resynchronized.

In general, the processing operations performed by the process blocks depicted herein may be performed using known hardware and/or software techniques. For example, the processing for a given block may be performed by processing logic that may comprise hardware (circuitry, dedicated logic, etc.), software (such as is run on a general purpose computer system or a dedicated machine), or a combination of both.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wireless communication method, said method comprising:
    employing antenna elements from a plurality of terminals to support cooperative multiple-input multiple-output (MIMO) downlink reception in a wireless network;
    exchanging data between said plurality of terminals, wherein said exchanging data is performed via a data exchange link;
    receiving downlink data signals at said plurality of terminals;
    performing initial signal processing on received downlink data signals by at least one of said plurality of terminals;
    transmitting signals corresponding to said processed signals to a first location for additional processing said additional processing comprises decoding and demodulation of said processed signals; and
    determining whether said downlink data signals comprise signals transmitted from antenna elements from a plurality of base stations or one or more antenna elements from a single base station,
    wherein said decoding of said processed signals comprises decoding according to said determination.

2. The method of claim 1 wherein said data exchange link is a short distance data exchange link.

3. The method of claim 2 wherein said short distance data exchange link comprises a IEEE 802.15 link.

4. The method of claim 3 wherein said IEEE 802.15 link is a Bluetooth link.

5. The method of claim 2 wherein said short distance data exchange link comprises a wireless USB link.

6. The method of claim 2 wherein said short distance data exchange link comprises an in-band communication link.

7. The method of claim 6 wherein said in-band communication link is a relay.

8. The method of claim 1 wherein said first location is co-located with one of said plurality of terminals.

9. The method of claim 1 wherein said first location is separately located from said plurality of terminals.

10. The method of claim 1 wherein said determining is performed at said terminal.

11. The method of claim 10 wherein said decoding is performed at said terminal.

12. A wireless communication method, said method comprising:
    employing antenna elements from a plurality of terminals to support cooperative multiple-input multiple-output (MIMO) uplink transmissions in a wireless network;

generating antenna drive signals by at least one of said plurality of terminals;

sending respective portions of said antenna drive signals to each of said plurality of terminals, wherein said sending respective portions of said antenna drive signals is performed, at least in part, via a data exchange link;

performing said cooperative MIMO uplink transmissions by driving selected antenna elements at the terminals with the respective portion of the antenna drive signals sent to those terminals; and determining whether said antenna drive signals are transmitted to antenna elements from a plurality of base stations or one or more antenna elements from a single base station, wherein said antenna drive signals are encoded according to said determination.

13. The method of claim 12 wherein said data exchange link is a short distance data exchange link.

14. The method of claim 13 wherein said short distance data exchange fink comprises a IEEE 802.15 link.

15. The method of claim 14 wherein said IEEE 802.15 link is a Bluetooth link.

16. The method of claim 13 wherein said short distance data exchange link comprises a wireless USB link.

17. The method of claim 13 wherein said short distance data exchange link comprises an in-band communication link.

18. The method of claim 17 wherein said in-band communication link is a relay.

* * * * *

UNITED STATES PATENT AND TRADEMARK OFFICE
CERTIFICATE OF CORRECTION

PATENT NO. : 8,396,153 B1  
APPLICATION NO. : 12/130277  
DATED : March 12, 2013  
INVENTOR(S) : Manyuan Shen et al.

Page 1 of 1

It is certified that error appears in the above-identified patent and that said Letters Patent is hereby corrected as shown below:

<u>Title Page 1, Item (57), ABSTRACT</u>:  
Column 2, line 32 (including headings), change "from" to --form--;

<u>Title Page 2, Item (56), OTHER PUBLICATIONS</u>:  
Column 1, line 41 (including headings), change "ATT&T" to --AT&T--;  
Column 2, line 50 (including headings), change "Systems," to --Systems;--;

<u>In the Claims</u>:

<u>Column 16</u>:  
Line 34, Claim 1, change "processing" to "processing, wherein";

<u>Column 18</u>:  
Line 4, Claim 14, change "fink" to --link--; and  
Line 4, Claim 14, change "a" to --an--.

Signed and Sealed this  
Twenty-sixth Day of November, 2013

Margaret A. Focarino  
*Commissioner for Patents of the United States Patent and Trademark Office*

UNITED STATES PATENT AND TRADEMARK OFFICE
CERTIFICATE OF CORRECTION

| | | |
|---|---|---|
| PATENT NO. | : 8,396,153 B1 | Page 1 of 1 |
| APPLICATION NO. | : 12/130277 | |
| DATED | : March 12, 2013 | |
| INVENTOR(S) | : Shen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1190 days.

Signed and Sealed this
Third Day of March, 2015

Michelle K. Lee
*Deputy Director of the United States Patent and Trademark Office*